US012772938B2

(12) United States Patent
Holliday

(10) Patent No.: US 12,772,938 B2
(45) Date of Patent: Oct. 27, 2026

(54) IRRIGATION WIRING AND TEST BOARD

(71) Applicant: Randy Holliday, Broomfield, CO (US)

(72) Inventor: Randy Holliday, Broomfield, CO (US)

( * ) Notice: Subject to any disclaimer, the term of this patent is extended or adjusted under 35 U.S.C. 154(b) by 0 days.

(21) Appl. No.: 19/264,604

(22) Filed: Jul. 9, 2025

(65) Prior Publication Data

US 2026/0123588 A1 May 7, 2026

Related U.S. Application Data

(60) Provisional application No. 63/716,576, filed on Nov. 5, 2024.

(51) Int. Cl.
*A01G 25/16* (2006.01)

(52) U.S. Cl.
CPC .................................... *A01G 25/16* (2013.01)

(58) Field of Classification Search
CPC .......... H05K 7/00; H05K 7/14; H05K 7/1417; H05K 5/02; H05K 5/0217; H05K 5/0247; H05K 5/03; H05K 5/069
See application file for complete search history.

(56) References Cited

U.S. PATENT DOCUMENTS 6,453,215 B1 * 9/2002 Lavoie ................... A01G 25/16 700/86
6,834,662 B1 * 12/2004 Olson .................... A01G 25/16 137/315.03
6,996,457 B2 2/2006 Williams et al.
7,181,319 B1 2/2007 Woytowtiz
7,243,005 B1 7/2007 Beutler et al.
7,613,546 B2 11/2009 Nelson et al.
7,916,458 B2 3/2011 Nelson et al.
8,234,014 B1 * 7/2012 Ingle .................... A01G 25/165 700/15
10,194,599 B2 * 2/2019 Ensworth ............... A01G 25/16
10,980,120 B2 4/2021 Kwak et al.
11,234,380 B2 2/2022 Micu et al.
11,277,973 B2 3/2022 Montgomery et al.
2007/0178747 A1 * 8/2007 Schrader ................ H01R 4/485 439/441
2014/0117108 A1 * 5/2014 Hong ................... A01G 25/167 239/64
2014/0222223 A1 * 8/2014 Horton ................. G05D 7/0617 700/284

(Continued)

FOREIGN PATENT DOCUMENTS

GB 2580476 A * 7/2020 ............. H02G 3/088
KR 102314756 B1 * 10/2021 ............... F16H 1/28

(Continued)

OTHER PUBLICATIONS

Machine translation of KR 102314756 (Year: 2021).*

(Continued)

*Primary Examiner* — Nathaniel J Kolb
(74) *Attorney, Agent, or Firm* — SHERIDAN ROSS P.C.

(57) ABSTRACT

Methods and systems are provided for an irrigation control, wiring, and testing apparatus. The irrigation control apparatus includes a wiring device that improves the organization of irrigation system wiring of a valve box. The wiring device also enables improved zone or watering valve identification. The apparatus enables testing of irrigation solenoids to verify operation of the irrigation system.

30 Claims, 17 Drawing Sheets

(56) References Cited

U.S. PATENT DOCUMENTS

| | | | | |
|---|---|---|---|---|
| 2015/0027774 | A1* | 1/2015 | Kang | H02B 1/28<br>174/535 |
| 2018/0307253 | A1* | 10/2018 | Weiler | A01G 25/165 |
| 2019/0148925 | A1 | 5/2019 | Pignato | |
| 2020/0378514 | A1 | 12/2020 | Hansen | |

FOREIGN PATENT DOCUMENTS

| | | | | | |
|---|---|---|---|---|---|
| KR | 20230037934 | A | * | 3/2023 | E01H 10/005 |
| KR | 20230138136 | A | * | 10/2023 | H05K 5/061 |

OTHER PUBLICATIONS

Machine translation of KR 20230138136 (Year: 2023).*

Machine translation of KR 20230037934 (Year: 2023).*

Morris, "Updates on state irrigation controller requirements," Irrigation & Lighting, Apr. 25, 2025, retrieved Oct. 3, 2025 from https://irrigationandlighting.org/news/updates-on-state-irrigation-controller-requirements/, 2 pages.

* cited by examiner

IRRIGATION WIRING AND TEST BOARD

CROSS-REFERENCE TO RELATED APPLICATION

The present application claims priority to and the benefit of U.S. Provisional Application No. 63/716,576, filed Nov. 5, 2024. The entire disclosure of the application listed is hereby incorporated by reference, in its entirety, for all that the disclosure teaches and for all purposes.

FIELD

The present disclosure is generally directed to irrigation systems and, in particular, devices, systems, and methods for connecting and testing sprinkler system wiring.

BACKGROUND

Current irrigation system practice includes setting one or multiple water zone valves in a pit 8 to 12 inches below ground or at whatever level the valves need to be placed to function properly in the landscaping scheme. This has been the practice for many years and creates many problems with the installation, as well as many problems in maintenance and testing. The sprinkler pipes are set below ground level and sprinkler risers (or "heads") are installed with the top of the head at or slightly below ground level. Once installed, a multi-sided box (e.g., a "valve box") with an open bottom and a removable lid is placed over the valves to create an accessible enclosure for the valves.

The zone valves are operated by a solenoid, usually 24-volt alternating current (AC) solenoid, but other voltages are available. Each valve location is fed by a plurality of conductor wires ranging from two to over 16 color-coded wires. These wires can be from 20 gauge to up to 14 gauge depending on the distance between the clock timer and the valves. The gauge is paired as to the size of the solenoid and current draw. Each solenoid valve has two multi-strand wires that are non-polarity sensitive. The current methodology is to use one of the solenoid valve wires as a neutral or ground wire (e.g., a black wires). The other colored wires are connected to each individual solenoid valve as a "hot" (e.g., power) wire from the sprinkler clock. The second solenoid wire is combined with all other neutral wires from the solenoid valves and the neutral wire coming into the box. This results in a large bundle of multistrand neutral wires that must be connected to a single 18-gauge solid strand wire. Typically, the connection is accomplished with a single wire connector nut. Many problems arise from grounding issues and mismatched wires being poorly grounded.

Another issue is that the wire-nutted connections end up located in the bottom of the pit within the enclosure in the dirt, mud, or even submerged in water which may create corrosion and shorted connections.

Often most residential and small commercial sprinkler systems are installed by the homeowner or a landscaping company. Landscapers are good at installing the piping for the water but may lack a good understanding of potential electrical issues. Most systems are poorly documented and the homeowner or an irrigation or sprinkler company that maintains the system may be at a loss as to where the zone valves are located and may have to undertake searching to find the specific zones. In addition, the homeowners and sprinkler maintenance people are often poorly equipped and/or lack the education required to diagnose issues that arise over time. For example, identifying a specific nonpreforming or broken valve in a zone box with multiple valves, identifying a specific valve associated with a specific zone in a valve box of multiple valves that is part of an irrigation system with multiple zones, identifying within a valve box the specific wiring associated with a specific zone or valve, understanding the wiring connections between the timer and the valves, and determining the cause of a specific performance issue after identifying the correct valve and zone are all potential issues. In addition, as noted above, zone valves tend to be located below ground in cramped and lightless pits further complicating problem solving and necessary repairs.

SUMMARY

There is a need in irrigation systems for a device that improves the reliability of the wiring, the separate identification of each zone or watering valve in a valve pit with multiple valves, and electrical testing of water valves. Embodiments according to aspects of the present disclosure comprise a hard-wired board or a printed circuit board (PCB) to provide discrete and secure connections for each of the zone valves, grounds, and specific stations. In some cases, the discrete and secure connections may be in communication with a processor on the PCB, or may alternatively be in communication with one or more external processors (e.g., such as when the device omits use of the PCB or processor). In some examples, the PCB may omit the use of vias, traces, combinations thereof, and/or the like.

Devices according to embodiments of the present disclosure are configured to elevate the wiring connections (e.g., hard wired boards or PCBs) off the ground at the bottom of the pit or box. According to embodiments of the present disclosure, in at least one instance, this may be accomplished using a ground stake that positions the board and associated wiring connections at a position within the box elevated above the ground. In at least a second embodiment, a bridge or brackets that connect to and extend from the sidewalls or upper rim of the enclosure may be used to support the board and the associated wiring connections at apposition within the box elevated above the ground. This keeps the wiring device below the lid of the enclosure and raised away from dirt, mud, moisture, and/or standing water within the pit or box. This also beneficially improves the case of service and installation of irrigation electronics.

Devices according to embodiments of the present disclosure may also be removable both to provide better access to the wiring connections and also to the solenoids and zone valves below. Devices according to embodiments of the present disclosure may be useful during initial construction of irrigation systems by helping ensure the zone valves are initially wired correctly to the clock, and also may be compatible with legacy irrigation systems such that existing zone valve boxes can be retrofitted.

In some embodiments, the device may be manufactured to be waterproof or water-resistant. For example, a device according to at least one embodiment of the present disclosure may be encased in a holder that may be filled with waterproof material, such as potting, to protect the PCB from moisture and the elements. Alternatively, the holder may be a case, preferably watertight, that surrounds the board and wiring connections.

A device according to at least one embodiment of the present disclosure comprises separate and discrete wiring connections for all solenoids and ground wiring. The device may additionally comprise light emitting diode (LED) lights associated with each zone that illuminate and identify which zone(s) are receiving power (e.g., a green LED is illuminated) or if zone(s) have a problem such as a bad solenoid (e.g., a red LED is illuminated). In one embodiment, the device may comprise a single LED (e.g., a green LED) that illuminates when the zone is receiving power and that remains off when the zone is not receiving power.

A device according to at least one embodiment of the present disclosure may comprise one or more LED lights (e.g., white LEDs) that illuminate for purposes of improving vision within a valve box or pit. For example, illumination from these one or more LEDs may illuminate the interior of the valve box in which the device is positioned, such that a homeowner, technician, or other individual maintaining the irrigation system would not need exterior lighting (e.g., a flashlight) when, for example, using the device to test solenoids in the valve box. In some cases, the one or more LED lights may be controlled (e.g., turned off or disabled) by actuating a switch on the device or on a remote device, such as a cellular phone with an app associated with the device. Illumination from the one or more LEDs may be available as long as power is provided to the device. Optionally, the device may include a power source, such as a rechargeable battery or capacitor, to power the one or more LEDs in the event of a power failure. Alternatively, the device may be connected to a solar panel (e.g., a solar panel placed on the lid of the irrigation box) to power the one or more LEDs (or more generally one or more components of the device).

A device according to at least one embodiment of the present disclosure comprises a voltmeter and/or ammeter mounted to a portion of the device (e.g., to a PCB of the device). The voltmeter and/or ammeter may include a display that shows how many volts are reaching a zone valve and/or how many amps a solenoid is drawing. Experience advises that, in many cases, an installer will connect too many valves to a single circuit-causing poor performance of or damage to the solenoid.

A device according to at least one embodiment of the present disclosure comprises a chip (e.g., a programmable chip, a Bluetooth® chip, combinations thereof, etc.) that performs diagnostics. Additionally or alternatively, other components such as sensors (e.g., moisture sensor(s)) may be installed on or near the device. The chip and the other components will communicate with a remote processor/controller. The communication may be by a wired or wireless route. For example, the other components may send one or more signals back to the sprinkler clock that may contain the remote processor/controller via, one of the spare wires and a board return port. The chip may be connected to a Wi-Fi device for constant remote monitoring and for generating system reports. Optionally, software may be provided for communications via a phone app that provides a homeowner or technician with relatively instantaneous feedback and communications. Data received by the chip (e.g., sensor measurements from one or more moisture sensors and/or one or more flow rate sensors) may be stored locally (e.g., on a local memory associated with the chip) and/or remotely. The data may also be saved temporarily or permanently. In one example, the chip may forward the data to a memory associated with the sprinkler clock, which in turn may automatically forward the data every unit period of time (e.g., daily, weekly, monthly, etc.) to a data storage unit for temporary or permanent storage.

A device according to at least one embodiment of the present disclosure comprises a ground block with separate screws or connections to a PCB with a universal ground, and dedicated circuits from the clock to the individual power connections. In addition, the PCB can comprise a programmable chip that enables the PCB to control irrigation in the respective zones. The PCB can also include an LED that illuminates to indicate to a homeowner or technician that the zone is in use, as well as a display that indicates the condition of the zone's power and voltage.

Embodiments of the present disclosure comprise a universal mount system compatible with a variety of valve boxes without tools, and to be adjustable to maintain the device above the ground or moisture level by positioning the adjusted to a preferred height above the ground but below the box lid. The positioning of the device may be accomplished by mounting the device to the underside of the box lid, hanging a mounting system on the open rim of the box, molding a mounting system into the side walls of the box, attaching a mounting system to the side wall or walls of a box, or with stakes that push into the ground in the bottom of the box. This accounts for different lengths, widths, and/or depths of different valve boxes. This toolless method accommodates both retrofit and new construction installations. The toolless method also improves utility by enabling the device to be removed to access the solenoid valves (e.g., to repair a broken solenoid valve). The PCB may be potted or sprayed to improve moisture resistance. Additionally or alternatively, universal mount system may be designed to position the PCB to avoid moisture issues (e.g., by placing the PCB board of the device above a bottom surface of the valve box).

A device according to at least one embodiment of the present disclosure may be self-diagnostic to enable a homeowner, residential landscaper, sprinkler maintenance company, technician, etc. to troubleshoot and resolve problems. This may be beneficial to individuals who are not well equipped to troubleshoot sprinkler systems.

Since irrigation systems consume a lot of water, monitoring and controlling irrigation systems is important. A device according to at least one embodiment of the present disclosure is equipped with remote communication capabilities (e.g., Wi-Fi, Bluetooth®, etc.) to allow a system operator (e.g., a homeowner; a commercial property owner; a manager of a ball field, park, golf course, or city public water board; etc.) to monitor and control the system remotely. For instance, zone valves may be equipped with individual flow meters that may report water use by zone and pinpoint any problems and, if the system is equipped, be able to shut down the troubled area without shutting down the whole system. In another example, moisture sensors may be positioned on the device, in the valve box, and/or about the property to generate moisture readings that can be used to disable one or more solenoids and/or the device (e.g., such as when there is sufficient rainfall that the irrigation system need not be run, when the valve box is flooded, etc.). The moisture sensors may communicate readings directly with a remote device (e.g., a smartphone application or other application on a user mobile device, a remote database, etc.). In other cases, the moisture sensor may communicate readings to such remote devices using an intermediate processor (e.g., a computing chip on the PCB) or other device. In some examples, such as with large municipalities with equally large irrigation systems, the PCB may be implemented with a geographic information system (GIS) to identify all sprinkler control boxes and report location and system performance. This may beneficially enable water conservation while also saving time associated with troubleshooting and/or repairing the irrigation system.

DETAILED DESCRIPTION

Embodiments of the present disclosure will be described in connection with systems, methods, devices, and apparatuses for wiring, testing, and/or controlling irrigation systems.

Figure 1A:
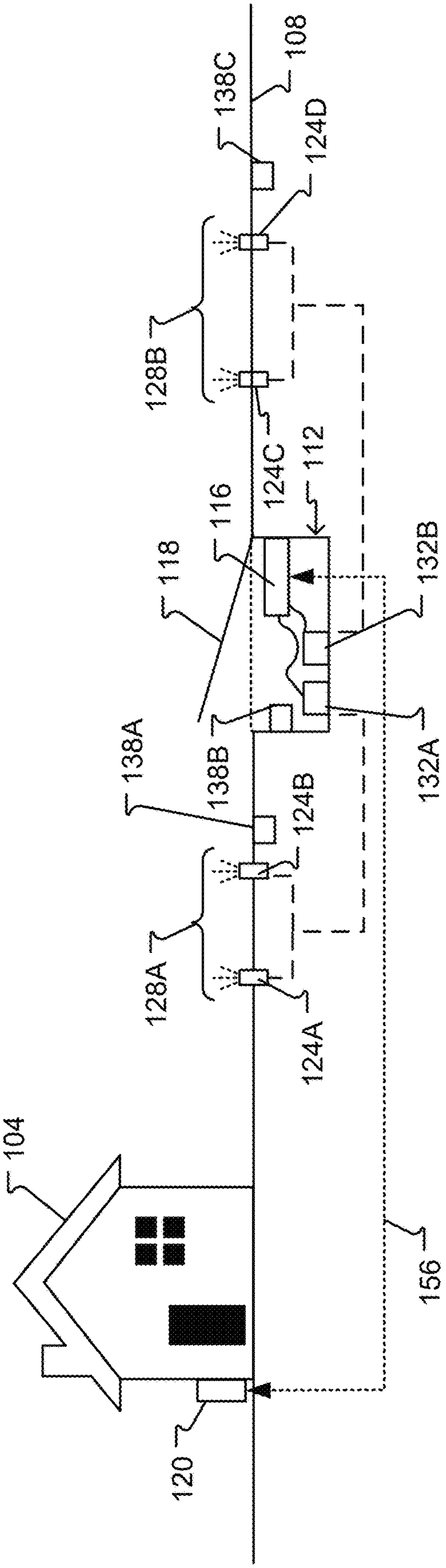
FIG. 1A shows a diagram of aspects of an irrigation system in accordance with embodiments of the present disclosure.
Figure 1B:
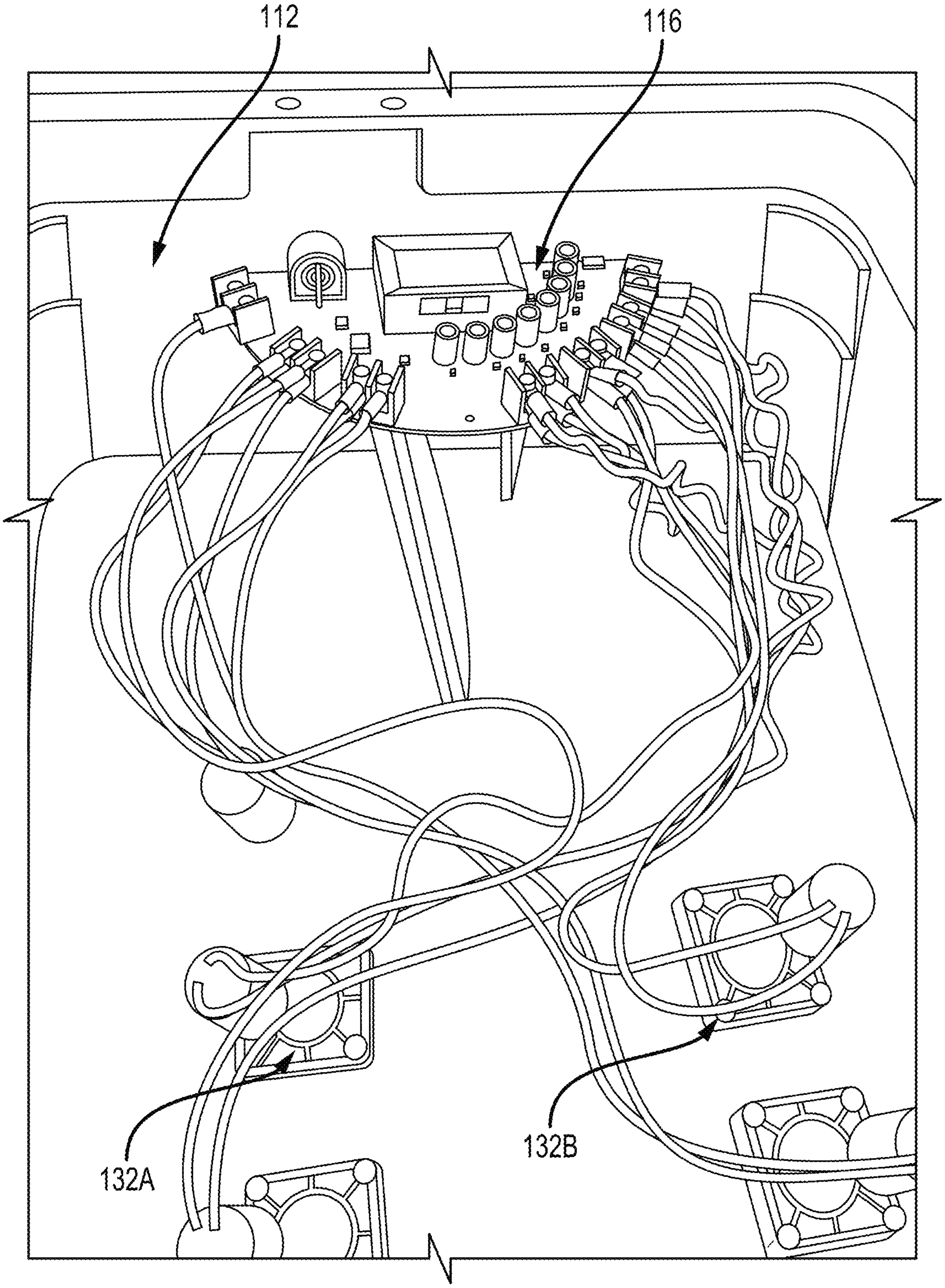
FIG. 1B shows a depiction of a wiring device positioned in a valve box in accordance with embodiments of the present disclosure.
Figure 1C:
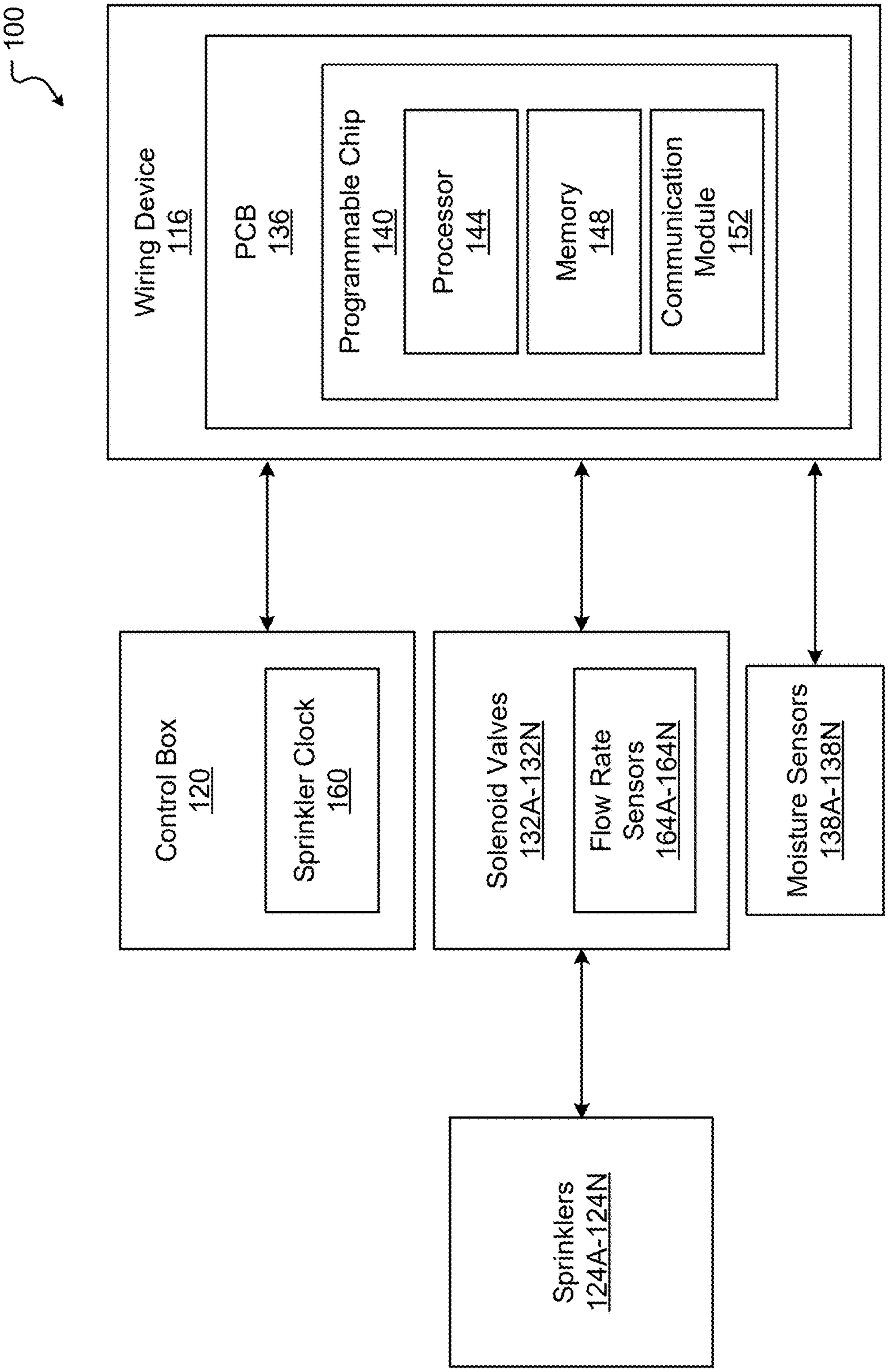
FIG. 1C shows a block diagram of additional aspects of the irrigation system in accordance with embodiments of the present disclosure.

Turning first to FIGS. 1A-1C, aspects of an irrigation system 100 are shown in accordance with at least one example embodiment of the present disclosure. The irrigation system 100 is illustrated to comprise a building 104 with a control box 120, and a valve box 112 or other subterranean space positioned below the ground surface 108 that includes a wiring device 116, a lid 118, and solenoid valves 132A-132N for controlling water flow to sprinklers 124A-124N of one or more zones 128A-128N. It is to be understood that additional or alternative components may be present in the irrigation system 100.

The building 104 may be a commercial building (e.g., a golf course maintenance shed or clubhouse, etc.), a residential building (e.g., an individual residence, a multi-family residence, such as an apartment complex, etc.), an industrial building (e.g., a factory, office building or mall), and/or the like. As an example, the building 104 may be an individual residence and the irrigation system 100 may correspond to the sprinkler system installed in the individual residence. As another example, the building 104 may be a golf course maintenance building and the irrigation system 100 may correspond to the irrigation system used to water the golf course. In some cases, the building 104 may not be a habitable structure but may be a structure dedicated to the sole use of housing the control box 120, such as when the irrigation system 100 is installed at a public park or other outdoor area. Most any structure that shields the control box 120 from outside environmental conditions will suffice.

The control box 120 may enable control of the sprinklers 124A-124N using a sprinkler clock 160. The sprinkler clock 160 may be or comprise a programmable interface that enables a user of the irrigation system 100 (e.g., a technician, a homeowner, a landscape manager, etc.) to adjust one or more parameters of a timer for operating one or more of the sprinklers 124A-124N in one or more of the zones 128A-128N. For example, the sprinkler clock 160 may enable the user to choose the day of week, time of day, irrigation duration, etc. during which sprinklers in the zones 128A-128N are turned on (e.g., every day of the week from 6:00 AM to 6:15 AM, every other day from 7:00 PM to 7:30 PM, etc.). Additionally or alternatively, the sprinkler clock 160 may enable control of individual zones. For example, the sprinkler clock 160 may enable the user to turn on a first zone 128A and turn off a second zone 128B, such that a first sprinkler 124A and a second sprinkler 124B of the first zone 128A both output water, while a third sprinkler 124C and a fourth sprinkler 124D of the second zone 128B do not output water.

In some cases, the clock 160 may comprise analytical hardware and/or software that enables the clock 160 to receive information and adjust the one or more parameters. For instance, the clock 160 may download current weather forecasts and update operation of the sprinklers 124A-124N accordingly (e.g., the forecast predicts rain in the afternoon, and the clock 160 disables the sprinklers 124A-124N during the afternoon). Additionally or alternatively, the clock 160 may consider measurements from one or more moisture sensors 138A-138N in adjusting the one or more parameters. For example, the clock 160 may receive a sensor reading indicating a particular zone does not require water (e.g., the sensor reading is greater than a threshold value), and the clock 160 may disable watering of the zone until the sensor readings indicate that zone requires water (e.g., the sensor reading is less than or equal to the threshold value).

The zones 128A-128N may correspond to areas of a property or other land that is irrigated by the sprinklers 124A-124N. For example, the first zone 128A may correspond to the front yard of a residential home and the second zone 128B may correspond to the back yard of the residential home. In some cases, the property may comprise additional numbers of zones (a golf course, park, or commercial property may comprise a plurality of zones, e.g., more than two zones). The zones 128A-128N may each comprise one or more sprinklers, such as the first zone 128A that includes the first sprinkler 124A and the second sprinkler 124B and the second zone 128B that includes the third sprinkler 124C and the fourth sprinkler 124D. In other examples, each of the zones 128A-128N may comprise an additional or alternative number of sprinklers. As is known to those of skill in the art, the types of sprinklers may vary, including drip irrigation devices, including for example, flood bubblers, micro bubblers, stream bubblers, and different varieties of spray systems such as stationary sprinklers, multi-stream rotary sprinklers, gear-driven sprinklers, impact sprinklers, and pop-up sprinklers. In one example, each zone of the zones 128A-128N may correspond to a respective solenoid valve of the solenoid valves 132A-132N such that the total number of zones 128A-128N is equal to the total number of solenoid valves 132A-132N. In such a scenario, each sprinkler within a zone will turn off or on based upon the operation of the single solenoid valve associated with the zone. In other scenarios, a single zone may have a plurality of solenoid valves, each controlling water flow to one or more different sprinklers.

Each of the zones 128A-128N may have a corresponding solenoid valve 132A-132N positioned within the valve box 112. The valve box 112 may be located proximate the building 104 (e.g., in a front yard of a residential home), or may alternatively be positioned elsewhere (e.g., remote from the building 104). A large property (e.g., an estate, golf course, park, etc.) may have multiple valve boxes 112 containing multiple solenoid valves 132A-132N for multiple zones 128A-12N but less than all zones.

The valve box 112 may also include the wiring device 116. The wiring device 116, as discussed in further detail herein, may electrically connect the solenoids of the solenoid valves 132A-132N to the control box 120. In other words, the control box 120 may send signals (as depicted with the arrow 156 in FIG. 1A) to wiring device 116 that are relayed to the solenoids of the solenoid valves 132A-132N to enable or disable water flow to sprinklers 124A-124N within the zones 128A-128N that correspond to the activated solenoids. In the example shown in FIG. 1A, a first solenoid valve 132A controls water flow to the first sprinkler 124A and the second sprinkler 124B of the first zone 128A and a second solenoid valve 132B controls water flow to the third sprinkler 124C and the fourth sprinkler 124D of the second zone 128B. It is to be understood that an additional or alternative number of solenoid valves 132A-132N may be present in the valve box 112.

With reference to FIG. 1C, the wiring device 116 may comprise a printed circuit board (PCB) 136 and a programmable chip 140 with a processor 144, a memory 148, and a communication module 152, although in other examples the wiring device 116 may comprise additional or alternative components (e.g., a power source such as a rechargeable battery for powering one or more components of the PCB 136 such as the programmable chip 140).

The programmable chip 140, through use of the processor 144, the memory 148, and the communication module 152, may enable both electrical control and testing of solenoids. Control may occur in combination with the sprinkler clock 160 as part of normal operation, or without involvement of the clock, for example, when manually overriding the clock schedule to turn on a specific zone. The programmable chip 140 may also communicate with sensors to alter operation of the irrigation system. In a typical operation, the memory 148 will store an operation schedule identifying the days of the week, the times of the day and the duration for running sprinklers. At the scheduled time, the processor 144 will be triggered by the sprinkler clock 160 to open a solenoid valve associated with one or more sprinklers in a zone and shut the solenoid valve at the scheduled time. Communication between the processor 144 and solenoid valves 132A-132N occurs via the communication module 152.

In some embodiments, the programmable chip 140 may be or comprise a Wi-Fi chip, although alternative types of chips are also possible. In one example, the programmable chip 140 comprises one or more ESP32 microcontrollers with integrated Wi-Fi and dual-mode Bluetooth® capabilities. In some cases, the ESP32 microcontroller(s) may control one or more functions of the wiring device 116 described herein such as the testing capabilities of the wiring device 116.

In some embodiments, the programmable chip 140 may be omitted. Such embodiments may correspond to, for example, wiring devices that are installed in residential locations (e.g., a "residential" version of a wiring device) and/or locations where the functionality or capabilities of the programmable chip 140 is not required or desired.

An irrigation system may also include other components beyond sprinklers and solenoid valves, including, for example, the one or more moisture sensors 138A-138N that may be positioned on the PCB 136, within an interior of the valve box 112, or dispersed about a property and associated with specific zones (e.g., inserted into the ground). The one or more moisture sensors 138A-138N may each be connected with the PCB 136 (e.g., via a wired connection and/or wirelessly). Data generated by the one or more moisture sensors 138A-138N may be communicated to the processor 144 to control functions of the irrigation system. As an example, a moisture sensor associated with the first zone 128A (e.g., a first moisture sensor 138A) may send data to the programmable chip 140. The processor 144 may compare the data to stored data (e.g., threshold moisture values stored in the memory 148) and, when there is too much moisture (e.g., the moisture values measured by the moisture sensor meet or exceed a threshold moisture value stored in the memory 148) the processor 144 may shut down active watering or prohibit future watering at the first zone 128A until the sensed moisture at the first zone 128A is less than the threshold value. As another example, a moisture sensor may be mounted to the PCB 136. Here, if the programmable chip 140 receives a signal indicating moisture is detected, the concern may be that the zone box is flooded and, accordingly, the programmable chip 140 may automatically shut down the system.

The programmable chip 140 may additionally or alternatively communicate with a thermal overload device. The thermal overload device may detect when excessive heat (e.g., measured heat meeting or exceeding a threshold value) is present in the PCB 136 and disable one or more components of the PCB 136, the sprinkler clock 160, and/or the like until the excessive heat is no longer detected.

In some cases, the programmable chip 140 may receive additional information related to operation of the solenoid valves 132A-132N. For instance, the programmable chip 140 may communicate with one or more flow rate sensors 164A-164N positioned within the solenoid valves 132A-132N that measure the flow rate of water therethrough and/or the water pressure of the water flowing through the solenoid valves 132A-132N. The flow rate information and/or water pressure information, in combination with flow rate information and/or water pressure information stored in memory, may be used by the processor 144 to determine if excessive water is flowing through one or more solenoid valves (e.g., when the measured flow rate meets or exceeds a stored threshold value) and/or if the water pressure is low (e.g., when measured water pressure falls below a stored threshold value), and may automatically disable water flow through the solenoid (e.g., by closing the solenoid). In addition, the processor 144 may be programmed to save pertinent information regarding the event to memory and/or generate reporting information about the excessive water flow (e.g., for how long the excessive water flow occurred, the zone associated with the excessive water flow, status of solenoids, etc.) and/or low water pressure and send such information to a remote device, such as a server, user (e.g., via a mobile device application), and/or the like.

The processor 144 may correspond to one or more computer processing devices or processing circuitry. For example, the processor 144 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the processor 144 may be provided as a Central Processing Unit ("CPU"), a microprocessor, or a plurality of microprocessors that are configured to execute the instructions sets stored in memory 148. Upon executing the instruction sets stored in the memory 148, the processor 144 enables various communications, testing of one or more solenoid valves 132A-132N, and/or interaction functions of the wiring device 116 with the control box 120, a user mobile communication device (e.g., a user smartphone), and may provide an ability to establish and maintain communication channels between the wiring device 116 and the control box 120, the user mobile communication device, etc. Non-limiting examples of a processor include a microprocessor, an IC chip, a General Processing Unit ("GPU"), a CPU, or the like. Examples of the processor 144 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The memory 148, or storage memory, may correspond to any type of non-transitory computer-readable medium. In some embodiments, the memory 148 may comprise volatile or non-volatile memory and a controller for the same. Non-limiting examples of the memory 148 that may be utilized in the wiring device 116 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 148 may be used to store information about communications, identifications, conditional requirements, times, authentication, history, and/or the like. In some embodiments, the memory 148 may be configured to store rules and/or the instruction sets depicted in addition to temporarily storing data for the processor 144 to execute various types of routines or functions. Although not depicted, the memory 148 may include instructions that enable the processor 144 to store data into a memory storage device and retrieve information from the memory storage device. In some embodiments, the memory storage device or the data stored therein may be stored internal to the wiring device 116 (e.g., within the memory 148 of the wiring device 116) or in a separate, remote location (e.g., in memory of the control box 120).

The communication module 152 may provide the wiring device 116 with the ability to send and receive communication packets or the like. The communication module 152 may comprise a network port, a modem, drives for the same, and the like capable of enabling communication between the wiring device 116 and other components of the irrigation system 100 (e.g., the control box 120), as well as between the wiring device 116 and components not in the irrigation system 100 (e.g., a user smartphone). Communications between the wiring device 116 and other components may flow through the communication module 152 of the wiring device 116. Some non-limiting examples of a suitable network interface for the communication module 152 include an antenna, a driver circuit, an Ethernet port, etc.

The PCB 136 may comprise electrical components such as resistors, inductors, capacitors, transformers, transistors, diodes, relays, overload protectors, switches, etc. that enable the PCB 136 to perform the functions described herein. The PCB 136 may enable the wiring device 116 to control the solenoid valves 132A-132N based on signals received from the control box 120. For example, the wiring device 116 may receive signals from the sprinkler clock 160 of the control box 120 to actuate the first solenoid valve 132A to enable water to flow to the first zone 128A. The wiring device 116 may then relay the signal to actuate the first solenoid valve 132A. The wiring device 116 may then later receive a signal from the sprinkler clock 160 of the control box 120 to actuate the first solenoid valve 132A again to disable water flow to the first zone 128A. The wiring device 116 may then relays the signal to the first solenoid valve 132A again to stop the flow of water to the first zone 128A. Power for the PCB 136 may be provided by the clock 160 (e.g., an auxiliary 24 V supply from the clock 160 that is wired to the PCB 136), one or more batteries or power supplies located on the PCB 136 (e.g., a rechargeable battery charged by a solar panel), a power supply outside the irrigation system 100, combinations thereof, and/or the like.

Figure 1D:
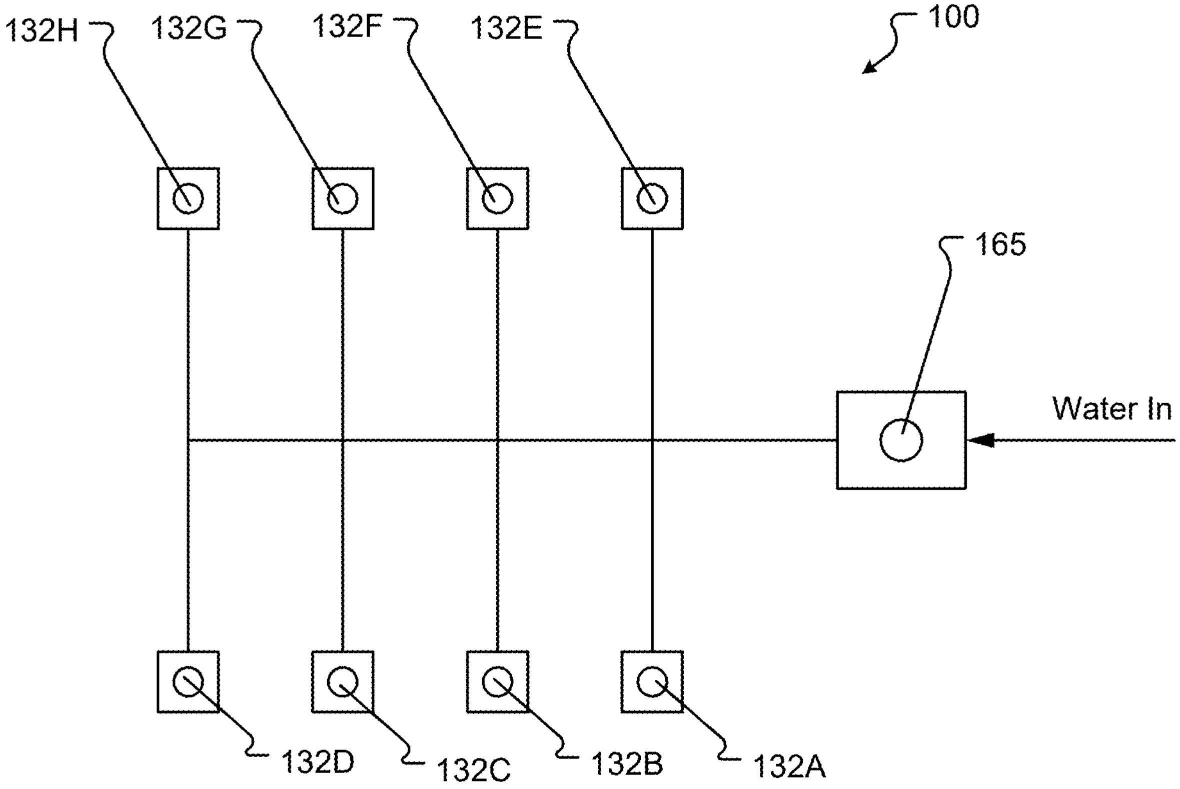
FIG. 1D shows a diagram of aspects of a shutoff valve of the irrigation system in accordance with embodiments of the present disclosure.

In some embodiments, the irrigation system 100 may comprise a shutoff valve 165 (e.g., a "master" shut off valve) located upstream from one or more of the solenoid valves 132-132N, as depicted in FIG. 1D. In cases where one or more solenoid valves break or fail to properly shut off when the power to the solenoid valve is turned off, the shut off valve may be actuated to disable water flow to the one or more zones 128A-128N. In some examples, the shutoff valve 165 may be wired to the wiring device 116 and actuated by the sprinkler clock 160 upon detection that the one or more solenoid valves are broken or have failed to properly shut off. In such examples, the shutoff valve 165 may be actuated by the processor 144 of the programmable chip 140 based on data received from the one or more flow rate sensors 164A-164N. The processor 144 may compare the flow rate information and/or water pressure information received from, for example, a first flow rate sensor 164A associated with the first solenoid valve 132A. The processor 144 may process the received information and, when water is still flowing (e.g., measured flow rate meets or exceeds a stored threshold value) and/or the water pressure is high (e.g., when measured water pressure exceeds a stored threshold value) after the first solenoid valve 132A has been turned off, actuate the shutoff valve 165 to disable water flow to the one or more zones 128A-128N. In some cases, the shutoff valve 165 may be closed by default and opened when water flow to the one or more zones 128A-128N is enabled by the processor 144. The default closed position of the shutoff valve 165 may beneficially prevent unwanted water from leaking or otherwise flowing through the irrigation system 100.

In some embodiments, data from the one or more flow rate sensors 164A-164N, data from the one or more moisture sensors 138A-138N, diagnostic data, combinations thereof, and/or the like may be tracked and stored by the PCB 136 (e.g., in the memory 148, in a database, etc.). The data may be used to generate historical water usage information of the zones 128A-128N of the irrigation system 100. In some cases, the historical water usage information may provide detailed information on amount of water used, irrigation frequency, combinations thereof, etc. for each zone. The information may be rendered to a display (e.g., displayed to the user's smartphone screen via an irrigation application). Such information may be beneficial in, for example, determining whether devices in each zone such as sprinkler heads, pipes, etc. are properly functioning (e.g., excessive water usage may indicate a pipe burst or a broken sprinkler head). The PCB 136 may store the data temporarily (e.g., in a local memory) and/or may forward or otherwise send the data to a remote device (e.g., a handheld user device of the owner of the irrigation system 100), a centralized data storage device, the control box 120, combinations thereof, and/or the like for further temporary, long-term, or permanent storage.

The wiring device 116 may comprise a variety of configurations. With reference to FIGS. 2A-2E, aspects of one embodiment of a wiring device 116 are shown in accordance with at least one example embodiment of the present disclosure. Here, the wiring device 116 is physically positionable within the valve box 112 to provide wiring and electrical control and testing capabilities. The wiring device 116 in this embodiment comprises a platform 204 with ground ports 208A-208N and zone valve ports 212A-212N, a stake 202, and mounts 224A-224B. The plurality of spaced apart ports may enable a user of the irrigation system 100 (e.g., a homeowner, a technician, landscape manager, etc.) to more effectively organize the wiring in the valve box 112.

Figure 2A:
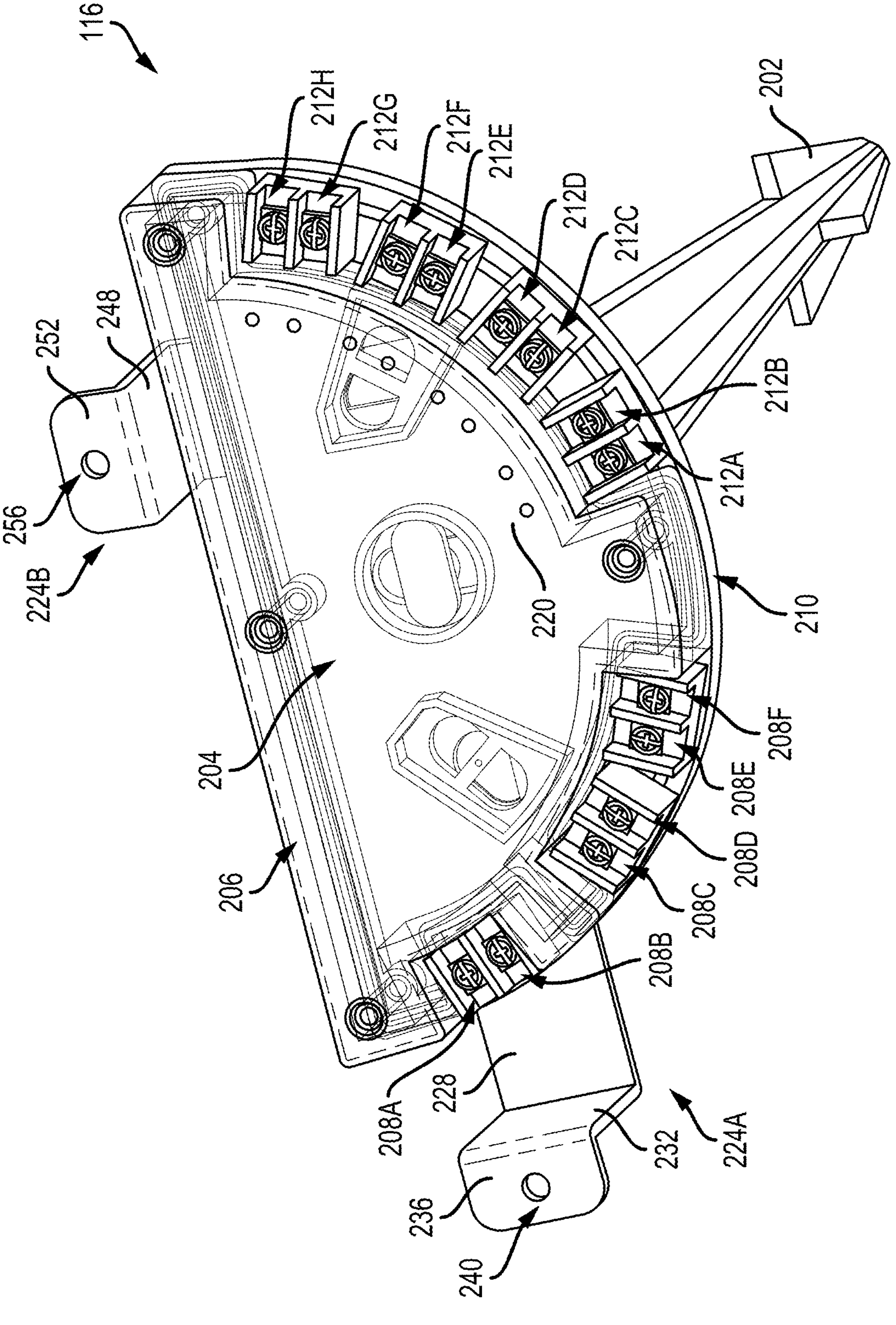
FIG. 2A shows an elevated view of an apparatus in accordance with embodiments of the present disclosure.
Figure 2B:
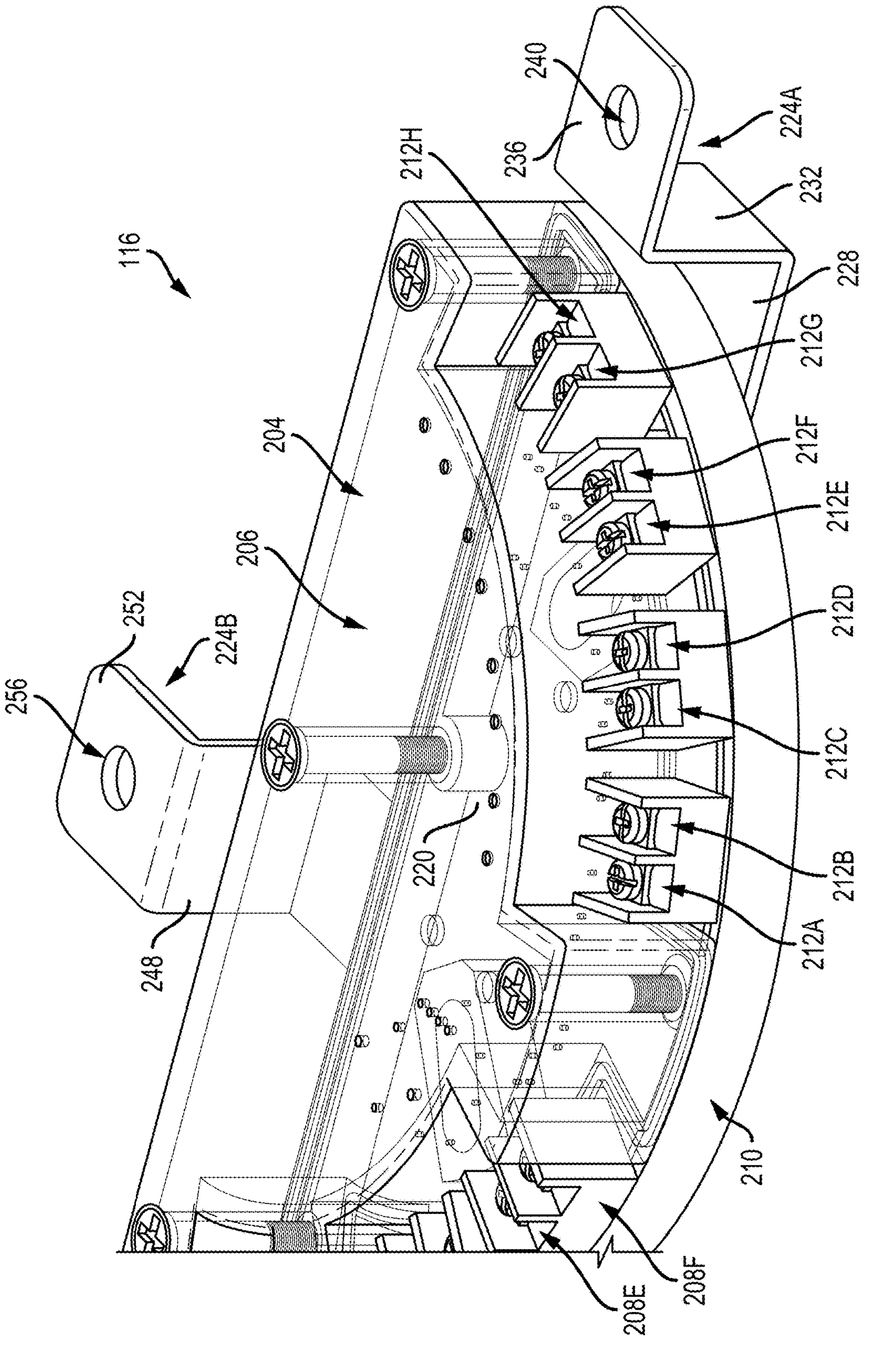
FIG. 2B shows an alternative view of the apparatus of FIG. 2A in accordance with embodiments of the present disclosure.
Figure 2C:
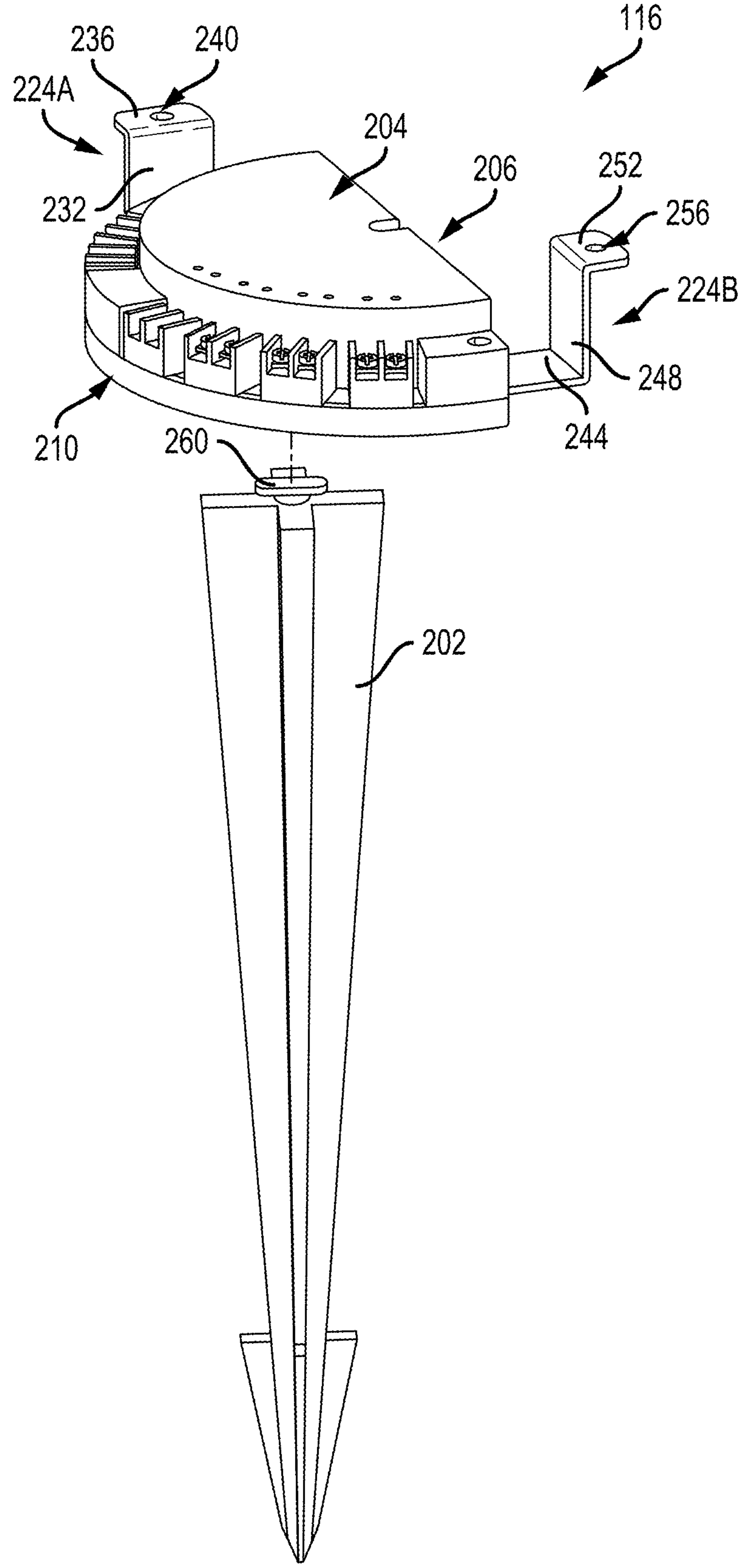
FIG. 2C shows an alternative view of the apparatus of FIG. 2A in accordance with embodiments of the present disclosure.
Figure 2D:
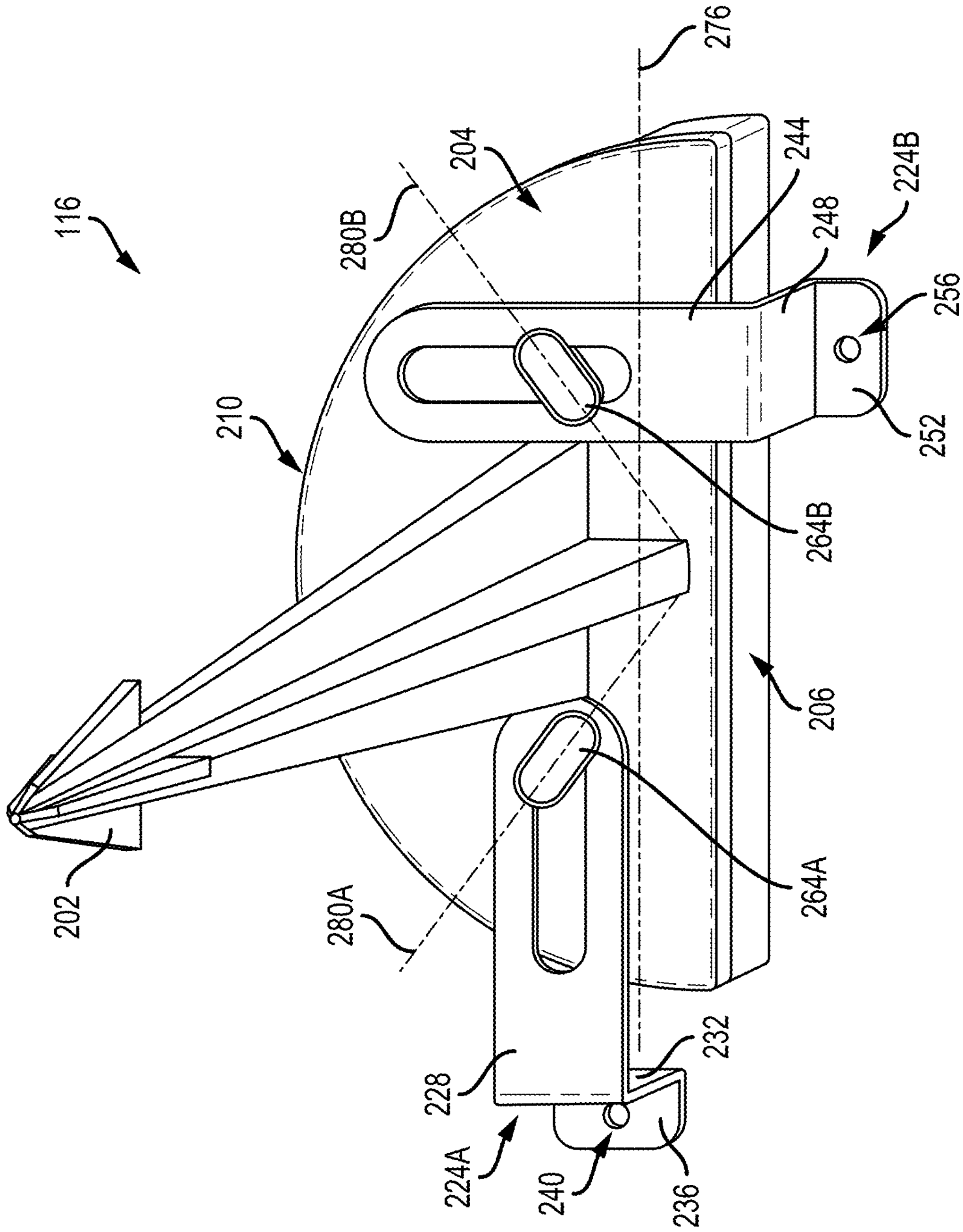
FIG. 2D shows an alternative view of the apparatus of FIG. 2A in accordance with embodiments of the present disclosure.
Figure 2E:
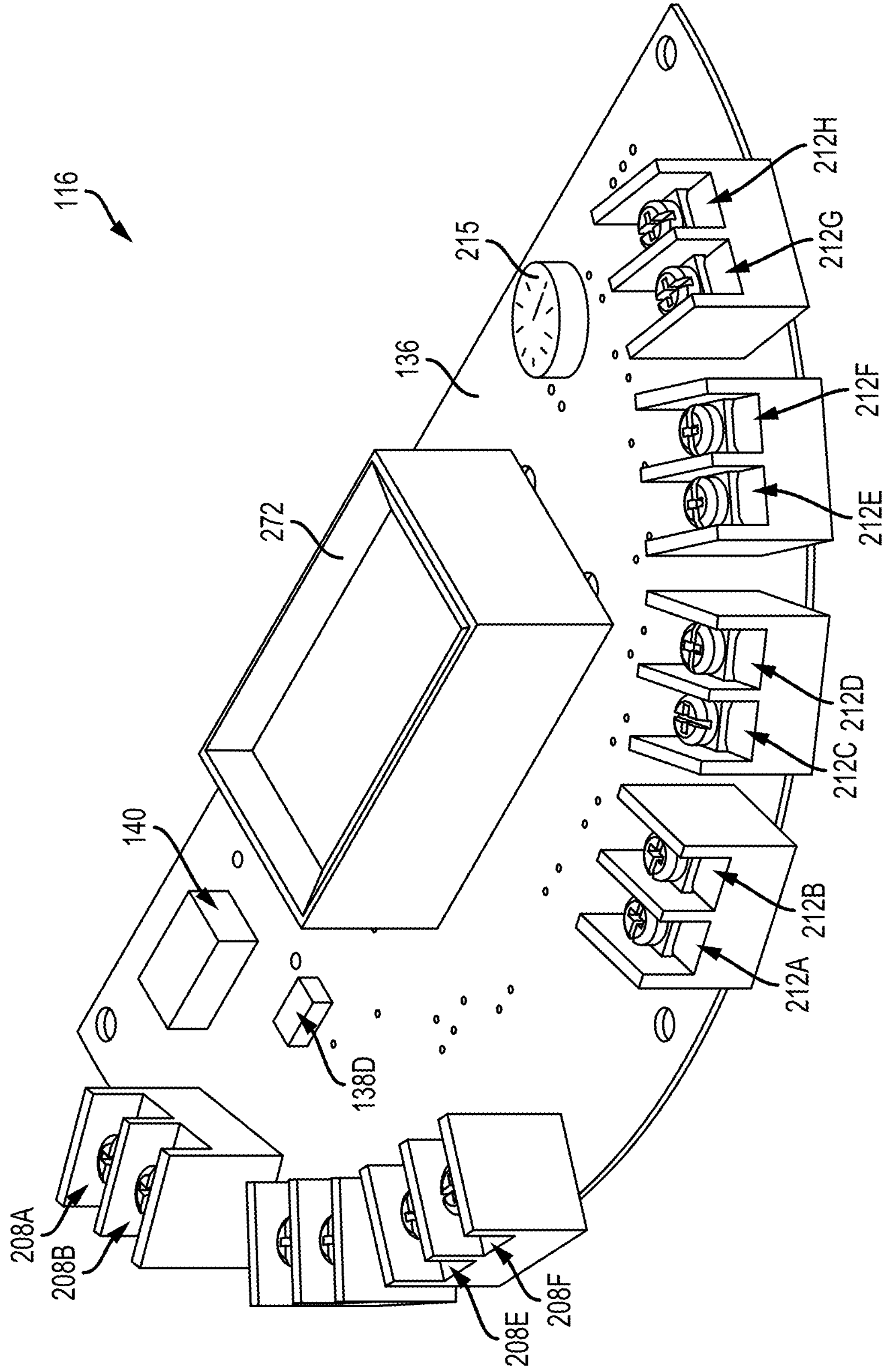
FIG. 2E shows aspects of a printed circuit board (PCB) of the apparatus of FIG. 2A in accordance with embodiments of the present disclosure.

The platform 204 may provide a cavity or interior in which the PCB 136 can be placed, as shown in FIG. 2E. In other words, the platform 204 may shield or protect the PCB 136 from exposure to dirt, mud, water, and/or the like when the wiring device 116 is placed within the valve box 112. The platform 204 may house additional or alternative components of the wiring device 116, such as portions of the ground ports 208A-208N, the zone valve ports 212A-212N, the stake 202, and/or the mounts 224A-224B. The platform 204 may comprise potting or other protective material positioned around one or more components of the PCB 136 to mitigate or reduce the likelihood that the components of the PCB 136 are exposed to moisture, corrosive agents, and/or the like.

In some cases, the platform 204 may be semi-circular in shape. For example, the platform 204 may comprise a linear portion 206 and a non-linear portion 210. The shape of the platform 204 may enable the wiring device 116 to be accommodated in a greater variety of valve boxes. Here, the platform 204 is semi-circular and the linear portion 206 may enable the wiring device 116 to be positioned in the valve box 112 such that the platform 204 abuts an interior surface of the valve box 112, saving space and enabling a user to more easily access the components beneath the wiring device 116 (e.g., the wiring of the solenoids of the solenoid valves 132A-132N). The non-linear portion 210 provides additional space for the PCB 136, which may enable the platform 204 to include a greater number of ground ports 208A-208N, zone valve ports 212A-212N, combinations thereof, and/or the like.

The ground ports 208A-208N may provide locations to ground the solenoids of the solenoid valves 132A-132N. The wiring device 116 is illustrated to comprise six ground ports: a first ground port 208A, a second ground port 208B, a third ground port 208C, a fourth ground port 208D, a fifth ground port 208E, and a sixth ground port 208F. It is to be understood, however, that an additional or alternative number of ground ports may be present on the wiring device 116. Each of the ground ports 208A-208N may provide one or more ports that can be electrically connected to a ground on the PCB 136, such that wiring (e.g., wiring from a solenoid associated with the first solenoid valve 132A) connected to any of the ground ports 208A-208N is electrically grounded. In some examples, the ground ports 208A-208N may be positioned on a first portion of the wiring device 116 separate from the zone valve ports 212A-212N. For example, and as depicted in FIG. 2A, a portion of the platform 204 may physically separate the sixth ground port 208F from a first zone valve port 212A. This may beneficially enable the user to visually distinguish between the ground ports 208A-208N and the zone valve ports 212A-212N (to avoid or mitigate the likelihood of, for example, incorrect electrical connections between the solenoid and the wiring device 116 in cases where the solenoid is polarity sensitive).

The zone valve ports 212A-212N may provide locations to which a "hot" wire (e.g., a wire capable of receiving power from the sprinkler clock 160) of the solenoid valves 132A-132N can be connected. The wiring device 116 is illustrated to comprise eight zone valve ports: a first zone valve port 212A, a second zone valve port 212B, a third zone valve port 212C, a fourth zone valve port 212D, a fifth zone valve port 212E, a sixth zone valve port 212F, a seventh zone valve port 212G, and an eighth zone valve port 212H. It is to be understood, however, that an additional or alternative number of zone valve ports may be present on the wiring device 116. Each zone valve port may be configured to receive solenoid wiring and/or wiring from the sprinkler clock 160 (which may act as a power source for one or more components of the wiring device 116, for the solenoid, etc.). In other words, the use of the eight zone valve ports may enable the wiring device 116 to connect to and control up to eight solenoids in the valve box 112. In one example, each zone valve port may be configured to receive and connect the "hot" wires from a solenoid with a "hot" wire from the clock 160 using a wire nut connector.

Figure 2F:
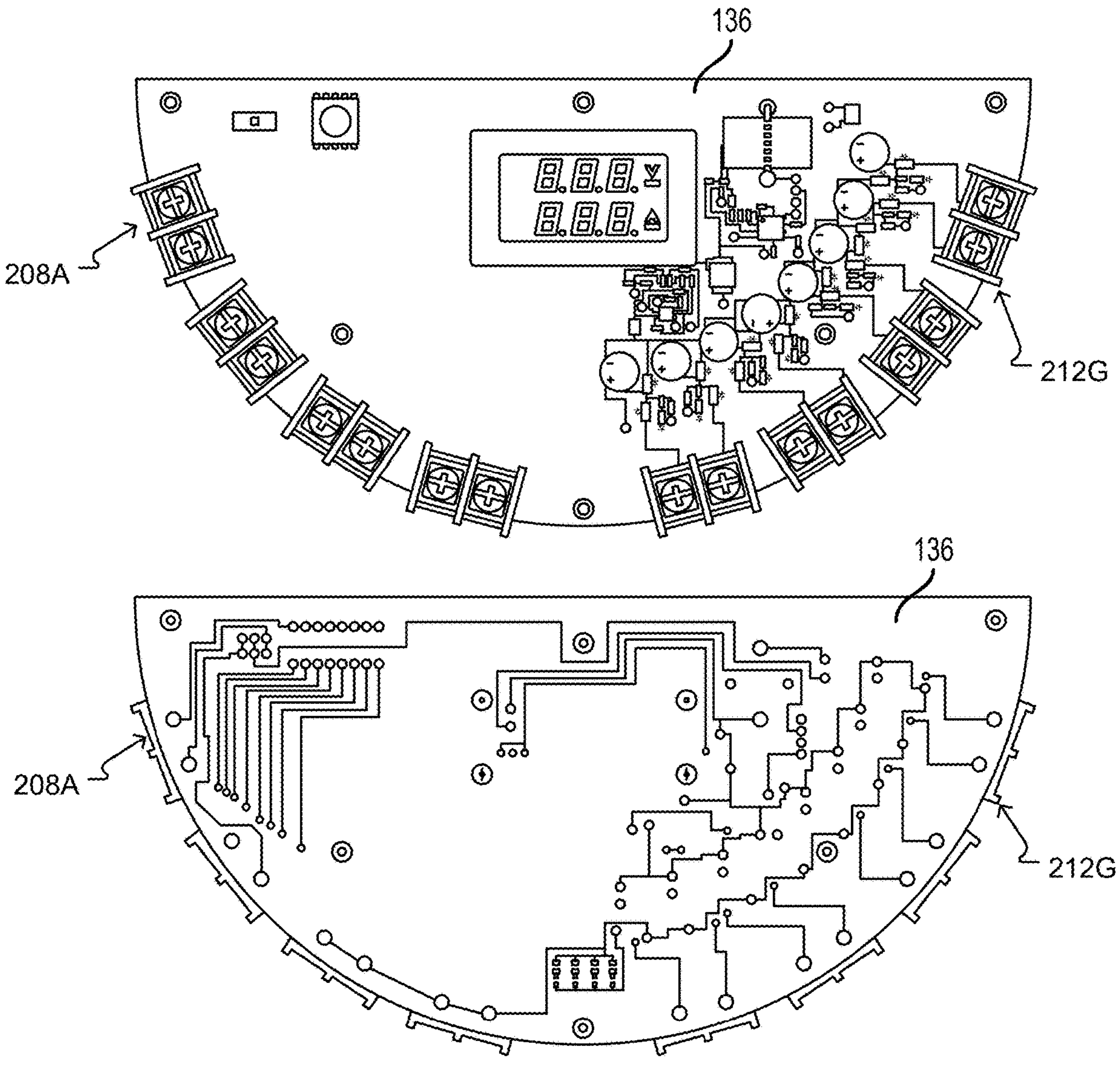
FIG. 2F shows aspects of a rotary switch and a wiring schematic of the apparatus of FIG. 2A in accordance with embodiments of the present disclosure.

In some embodiments, the platform 204 may comprise a rotary switch 215. The rotary switch 215 may be or comprise a switch, dial, or the like that enables each of the solenoid valves to be tested without the need to activate the sprinkler clock 160 for each zone. In other words, the rotary switch 215 may enable the user to test individual solenoid valves without needing to interact with the programmable interface of the sprinkler clock 160. In one embodiment, the rotary switch 215 may include an "off" setting and may be adjustable (e.g., via rotation of the rotary switch 215) to up to eight different positions that each correspond to a solenoid valve in the valve box 112. In this embodiment, the sprinkler valve box may contain fewer solenoids than the number of valve ports provided by the wiring device 116 (e.g., fewer than eight solenoids), such that the rotary switch 215 can be connected to the sprinkler clock 160 via one of the valve ports or ground ports. In some cases, the rotary switch 215 may be constantly powered by the sprinkler clock 160 by connecting a 24 V output from the sprinkler clock 160 to the first zone valve port 212A or the first ground port 208A (which is wired to the rotary switch 215) and by connecting a ground for the sprinkler clock 160 to the second ground port 208B or other ground port. An example of the electrical components and traces of the PCB 136 to enable the functionality of the rotary switch 215 (and of the remaining components of the platform 204) according to at least one embodiment of the present disclosure is depicted in FIG. 2F.

To test the solenoids valves with the rotary switch 215, the rotary switch 215 may be switched from the "off" setting to one of the eight output switches on the rotary switch 215. The corresponding solenoid valve may then receive the power relayed from the sprinkler clock 160 to test the functionality of the solenoid valve. In this way, a user may be able to manually rotate the rotary switch 215 to test one or more of the solenoid valves without needing to trigger the timer in the sprinkler clock 160. In other words, by providing the 24 V source from the sprinkler clock 160 to the rotary switch 215, the power can be routed to each individual solenoid to test the solenoid.

Figure 2G:
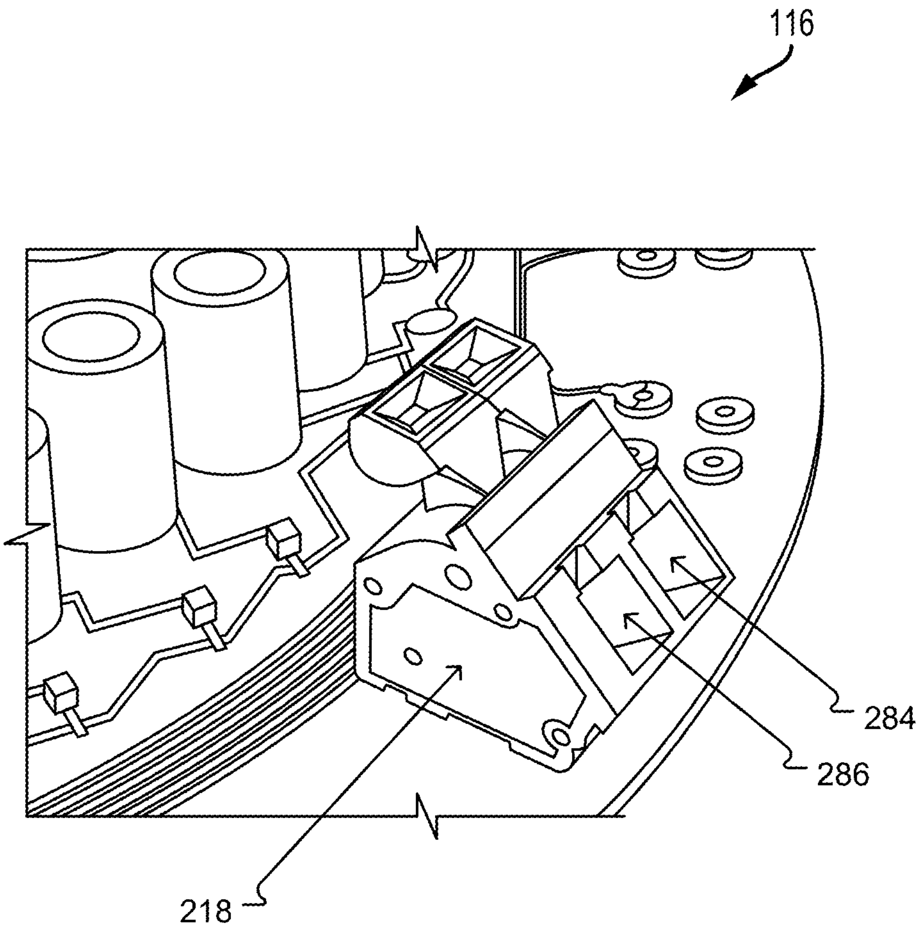
FIG. 2G shows aspects of a wire connector of the apparatus of FIG. 2A in accordance with embodiments of the present disclosure.

In some embodiments, the platform 204 may comprise a connector 218 (depicted in FIG. 2G). The connector 218 may be glued on, screwed into, or otherwise attached to the platform 204 to enable electrical and mechanical connection between the two wires inserted into the connector 218. In other words, the connector 218 may be or comprise a wire connector. In one example, the connector 218 comprises a solenoid port 284 into which a "hot" wire of a solenoid may be inserted and a clock port 286 into which a "hot" wire of the sprinkler clock 160 may be inserted. The connector 218 may enable current flow between the wiring in the two ports, such that the sprinkler clock 160 can control actuation of the solenoid. In some cases, the connector 218 may be or comprise a toolless connector that enables wires to be connected to and disconnected from the connector 218 without additional tooling. In one embodiment, the connector 218 may be used in addition to or alternatively to the ground ports 208A-208N and/or the zone valve ports 212A-212N to enable connection between the sprinkler clock 160 and one or more solenoids of the irrigation system 100.

It is to be understood that the mechanism used by the connector 218 to receive and retain the solenoid wire and/or the clock wire is in no way limited. For example, the connector 218 may comprise a spring terminal or other retention feature that keeps the wire seated within the connector 218 until a user wishes to remove the wire from the connector 218. The connector 218 may additionally or alternatively comprise plug and socket connectors, crimp-on connectors, binding posts, clamps, biasing mechanisms, combinations thereof, and/or the like to retain and connect the solenoid wire with the clock wire (or, more generally, any two wires connected to the solenoid port 284 and the clock port 286).

Moreover, a user of the connector 218 may manipulate, modify, or otherwise condition the solenoid wire and/or the clock wire before the wires interface with the connector 218. For example, a technician installing the platform 204 may modify or manipulate the solenoid wire to enable the wire to connect to the connector 218, such as by connecting the solenoid wire to a male connector that can interface with a female connector on the connector 218, by stripping insulation off the end of the wire to enable electrical connection with a spring or other conductive portion of the connector 218, combinations thereof, and/or the like.

Figure 2H:
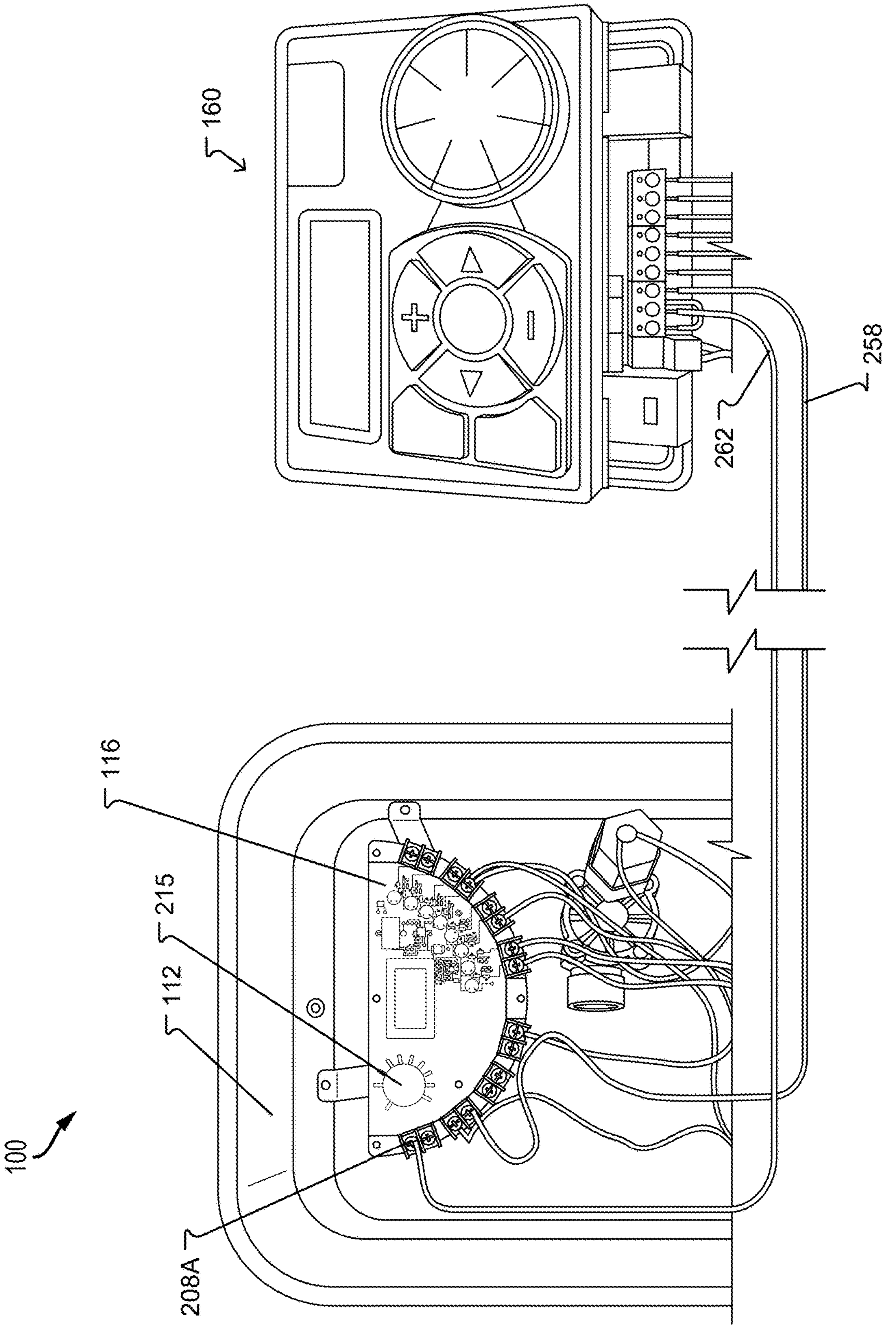
FIG. 2H shows aspects of a sprinkler clock connected to the PCB of the apparatus of FIG. 2A in accordance with embodiments of the present disclosure.

In some embodiments, the power output from the sprinkler clock 160 (e.g., the 24 V output) may be used to power one or more components of the wiring device 116 such as the programmable chip 140, the processor 144, the communication module 152, and/or the like, as shown in FIG. 2H. In such embodiments, the sprinkler clock 160 may be connected to a dedicated terminal positioned near one or more of the ground ports 208A-208N. For example, a hot wire 262 of the sprinkler clock 160 may be connected to the first ground port 208A, and a neutral wire 258 of the sprinkler clock 160 may be connected to the fourth ground port 208D, to provide a constant power supply to one or more components of the PCB 136. In this example, the wiring device 116 may comprise two terminals (e.g., the first ground port 208A and the fourth ground port 208D) for connecting the sprinkler clock 160 to the PCB 136, six terminals that function as ground ports (e.g., the remaining ground ports 208A-208N that are not directly wired to the sprinkler clock 160), and eight terminals that function as zone valve ports for the solenoids (e.g., zone valve ports 212A-212N), as depicted in FIG. 2H.

In some embodiments, one or more connectors 218 may be substituted for some or all the ground ports 208A-208N and/or the zone valve ports 212A-212N. In one example embodiment depicted in FIG. 2I, all the ground ports ground ports 208A-208N and all the zone valve ports 212A-212N may be replaced by connectors 218. The use of the connectors 218 may enable the sprinkler clock 160 to be wired to each solenoid valve of the solenoid valves 132A-132N via the connectors 218. For example, the sprinkler clock 160 may comprise a "hot" wire for each corresponding zone valve (e.g., a first zone "hot" wire 288 associated with the first solenoid valve 132A, a second zone "hot" wire associated with the second solenoid valve 132B, etc.) that is electrically and mechanically connected to a respective "hot" wire of the solenoid valve. In the illustrated embodiment in FIG. 2I, the sprinkler clock 160 includes the first zone "hot" wire 288 that is associated with the first solenoid valve 132A. The first zone "hot" wire 288 may be connected to the clock port 286 of the connector 218, and a solenoid "hot" wire 294 of the first solenoid valve 132A may be connected to the solenoid port 284 of the connector 218 to electrically and mechanically couple the zone "hot" wire 288 and the solenoid "hot" wire 294 (and correspondingly the sprinkler clock 160 to the first solenoid valve 132A). A solenoid neutral wire 290 of the first solenoid valve 132A may then be connected to a neutral or ground port of another connector 218 to form a completed circuit.

In some cases, the use of the connectors 218 may beneficially enhance the electrical and mechanical connection between the sprinkler clock 160 and each of the solenoid valves 132A-132N, improving controllability of the solenoid valves 132A-132N and functionality of the irrigation system 100. For instance, in some cases the wiring of the sprinkler clock 160 (e.g., the neutral wire 258, the hot wire 262, the first zone "hot" wire 288, etc.) may be or comprise solid wiring, while the wiring of the solenoid valves 132A-132N may be or comprise stranded wiring. The resulting physical connection (using, for example, wire nuts) between the solid wiring and the stranded wiring may lead to poor electrical connection between the sprinkler clock 160 and the solenoid valves 132A-132N. The use of the connectors 218 may beneficially eliminate the combination of solid wiring and stranded wiring in the same terminal and thus improve electrical and mechanical connection between the sprinkler clock 160 and the solenoid valves 132A-132N. In some instances, it may be preferable that each connector 218 receive only a single solid wire. In other words, it may be preferable that each connector 218 receive a wire from a solenoid and a wire from the sprinkler clock (instead of, say, receiving two solid wires from the sprinkler clock 160).

Each zone valve port may include a label 220 to, for example, assist a user of the wiring device 116 in identifying each zone valve port. In some examples, the label 220 may comprise an aperture that enables a light emitting diode (LED) to provide a visual indicator reflecting the functionality of the solenoid connected to the zone valve port. For example, a first solenoid of the first solenoid valve 132A and the sprinkler clock 160 may be electrically connected to the first zone valve port 212A (identified by the label "1" in FIG. 2B), and a second solenoid of the second solenoid valve 132B and the sprinkler clock 160 may be electrically connected to the second zone valve port 212B (identified by the label "2" in FIG. 2B). Each of the ports may include an LED that emits light from the aperture of the respective label. In some cases, the LED may illuminate when the solenoid is actuated to enable water flow (e.g., the LED emits white light) and may deactivate when the solenoid is not actuated. In other cases, the LED may emit different colors of light depending on the status of the solenoid. For example, the first solenoid of the first solenoid valve 132A may function properly but the second solenoid of the second solenoid valve 132B may experience a malfunction (e.g., due to electrical shorting, the solenoid does not actuate the second solenoid valve 132B). In this example, the LED associated with the first solenoid valve 132A may emit green light to indicate that the first solenoid is functioning properly, and the LED associated with the second solenoid valve 132B may emit red light to indicate that the second solenoid is malfunctioning.

The stake 202 may enable the wiring device 116 to be positioned elevated above the ground or a bottom surface of the valve box 112. The stake 202 may be used regardless of whether the valve box 112 includes a lid 118 or other surface to which the platform 204 can be attached. The stake 202 may comprise an elongated portion and a tab 260 or other attachment device that enables the stake 202 to be connected to the platform 204. In the example shown in FIG. 2C, the tab 260 may enable the stake 202 to be rotatably connected to the platform 204. The elongated portion of the stake 202 may then be driven into the ground at the bottom of the valve box 112, such that the platform 204 rests above the ground. In some cases, the elongated portion of the stake 202 may be adjustable to enable a user of the wiring device 116 to change the distance between the ground at the bottom surface of the valve box 112 and the wiring device 116. In some examples, the wiring device 116 may be compatible with more than one stake.

Additionally or alternatively, the wiring device 116 may comprise mounts 224A-224B. The mounts 224A-224B may be or comprise brackets or other fixtures that enable the wiring device 116 to be positioned above the bottom surface of the valve box 112, whether by attaching the wiring device 116 to an interior surface of the lid 118 of the valve box 112, to a lip or other surface of the valve box 112, and/or the like. The wiring device 116 is illustrated to comprise two mounts: a first mount 224A and a second mount 224B. It is to be understood, however, that an additional or alternative number of mounts may be used.

The first mount 224A includes a lower portion 228, a vertical portion 232, and an upper portion 236. The second mount 224B includes a lower portion 244, a vertical portion 248, and an upper portion 252. The vertical portion 232 may connect the lower portion 228 and the upper portion 236, and the vertical portion 248 may connect the lower portion 244 to the upper portion 252. Each of the lower portion 228 and the lower portion 244 may be respectively connected to the platform 204 via a first connector 264A and a second connector 264B. The first connector 264A and/or the second connector 264B may be adhered or connected to the platform 204 or may alternatively be molded as part of the outer surface of the platform 204 (e.g., the first connector 264A, the second connector 264B, and the platform 204 are manufactured as a single piece).

The first connector 264A and/or the second connector 264B may be positioned on the platform 204 at an angle relative to a platform axis 276 of the platform 204. For example, the first connector 264A and/or the second connector 264B may be angled about 45 degrees from the platform axis 276. In other words, an angle between the platform axis 276 and a first connector axis 280A of the first connector 264A, and an angle between the platform axis 276 and a second connector axis 280B of the second connector 264B, may be about 45 degrees (e.g., 45 degrees plus or minus a manufacturing tolerance such as 0.5 degrees). The 45-degree angle may facilitate connection of the first mount 224A and the second mount 224B to the platform 204 by, for example, enabling the first mount 224A and the second mount 224B to be rotatably mounted to the platform 204. As an example, the first mount 224A may be slid over the first connector 264A, such that the first mount 224A is positioned between the first connector 264A and a surface of the platform 204, and then rotated (e.g., by 45 degrees) relative to the first connector 264A and the platform 204 to lock the first mount 224A into place. The second mount 224B may be mounted to the platform 204 in the same fashion as the first mount 224A.

The vertical portion 232 and the vertical portion 248 may be offset from an outer surface of the platform 204 (such as when the lower portion 228 and the lower portion 244 extend past the outer surface of the platform 204) or may alternatively be flush with the outer surface of the platform 204. The length of the vertical portion 232 and the vertical portion 248 may be less than, equal to, or greater than a length of platform 204 along a first direction, such that an upper surface of the platform 204 respectively sits below, at the same height, or above each of the upper portion 236 and the upper portion 252 when the wiring device 116 is installed in the valve box 112.

The upper portion 236 may comprise an aperture 240, and the upper portion 252 may comprise an aperture 256, which may enable the upper portions 236, 252 (and by extension the wiring device 116) to be connected to one or more surfaces in the valve box 112 to position the wiring device 116 a first distance above the bottom surface of the valve box 112. The apertures 240, 256 may enable the mounts 224A-224B to be screwed into one or more surfaces of the valve box 112 and/or the lid 118 thereof to position the wiring device 116 above the bottom surface of the valve box 112. For example, the mounts 224A-224B may be screwed into a lip or outer surface of the valve box 112, such that the platform 204 is positioned within the valve box 112 (which permits the lid 118 to be placed on the valve box 112 without interference from the wiring device 116) and above the solenoid valves 132A-132N. The placement of the platform 204 above the bottom surface of the valve box 112 may enable the wiring device 116 to avoid any dirt, mud, water, etc. on or near the bottom surface of the valve box 112.

The PCB 136 may comprise a display 272, as seen in FIG. 2E. The display 272 may be or comprise an LED sign or similar structure that displays, for example, voltage and current information of one or more components of the PCB 136, of one or more solenoids of the solenoid valves 132A-132N, combinations thereof, and/or the like. For instance, the display 272 may display voltage measurements (e.g., a voltage in Volts) and/or current measurements (e.g., a current measurement in Amperes) of a solenoid valve that is being actuated to enable water to flow through the valve. In some cases, the sprinkler clock 160 may provide power to a solenoid of a solenoid (e.g., a first solenoid of the first solenoid valve 132A). The power may be provided based on commands entered by a user (e.g., the user manually controls the sprinkler clock 160 to activate one or more of the zones 128A-128N, the user controls the sprinkler clock 160 remotely using a mobile device application, etc.). After the solenoid is powered, the display 272 may display the voltage across the solenoid and/or the current value conducted by the solenoid. The voltage across the solenoid may in some cases be determined based on the difference in voltage values between the hot wire and the ground wire of the solenoid measured by a voltmeter. Additionally or alternatively, the voltage across the solenoid may be determined using any other conventional technique known in the art. The current conducted by the solenoid may be determined based on measurements generated by an ammeter or similar device placed in series with the solenoid. Additionally or alternatively, the current conducted by the solenoid may be determined using any other conventional technique known in the art.

In some cases, the display 272 may be coupled with LEDs or other illumination devices positioned within the platform 204, such that an LED associated with the active zones (and by extension, the solenoid being tested) is illuminated (e.g., with a red LED, with a white LED, etc.) while voltage and current information is displayed on the display 272 indicating to the user which solenoid is being tested. Additionally or alternatively, the illumination devices may illuminate based on the voltage and/or current values of the solenoid being tested. For example, the programmable chip 140 may compare the determined voltage to a threshold voltage value and/or compare the determined current to a threshold current value, and may cause the illumination device to emit light when the determined voltage meets or exceeds (or, in other embodiments, falls below) the threshold voltage value and/or cause the illumination device to emit light when the determined current meets or exceeds (or, in other embodiments, falls below) the threshold current value. In some embodiments, the PCB 136 may comprise a dedicated illumination device for each port to which a solenoid is connectable (e.g., with eight zone valve ports 212A-212N, the PCB 136 may comprise eight illumination devices) and/or a dedicated illumination device for illuminating when the voltage and current measurements meet or exceed (or, in some embodiments, falls below) a respective threshold value.

In some examples, the display 272 be positioned or embodied in a device remote from the PCB 136. For instance, the display 272 may correspond to a virtual display rendered to a display on a mobile device (e.g., a user's smartphone), and voltage and/or current information may be rendered to the mobile device. In this example, the user may be using a mobile device application that is paired with the wiring device 116 (e.g., via the communication module 152 using Wi-Fi, Bluetooth®, etc.), such that the user can remotely test one or more solenoids and receive voltage and/or current information about each tested solenoid.

Figure 3A:
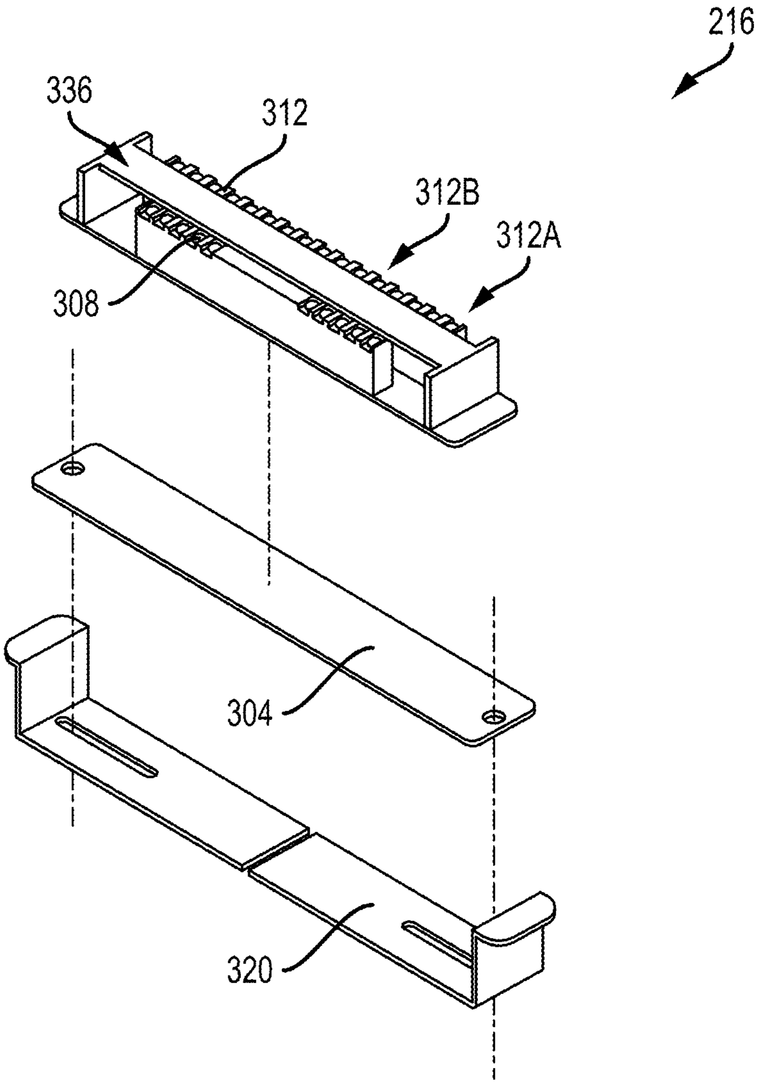
FIG. 3A shows an exploded view of an apparatus in accordance with embodiments of the present disclosure.
Figure 3B:
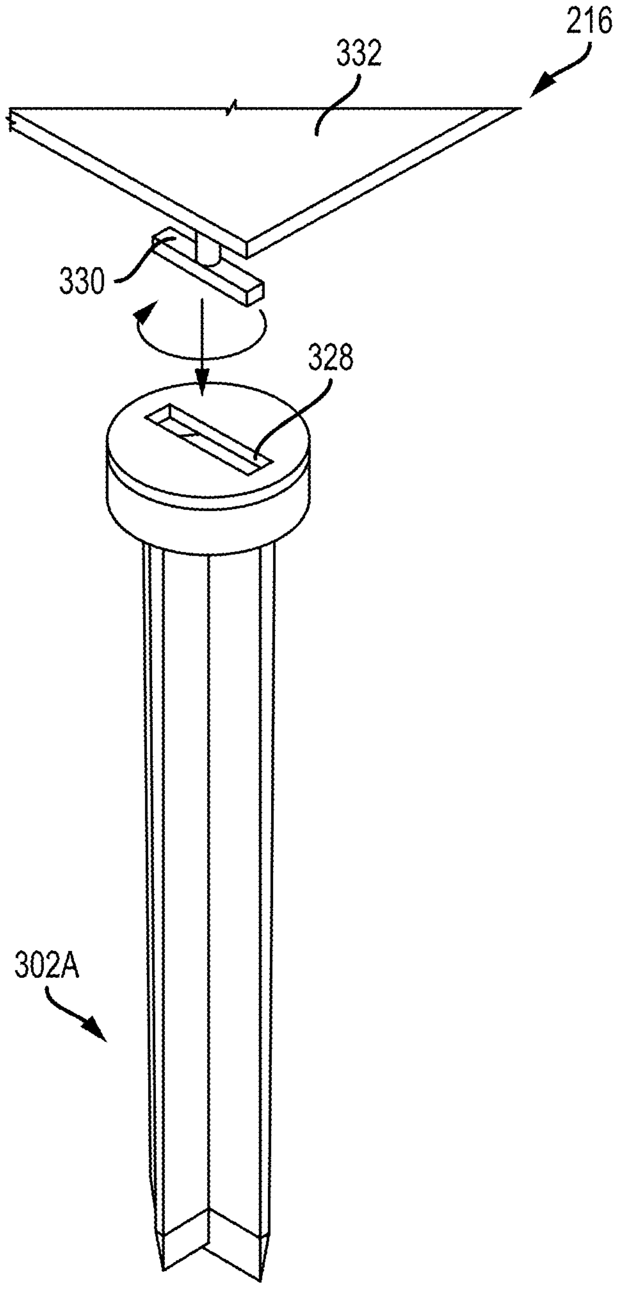
FIG. 3B shows an attachment mechanism of the apparatus of FIG. 3A in accordance with embodiments of the present disclosure.
Figure 3C:
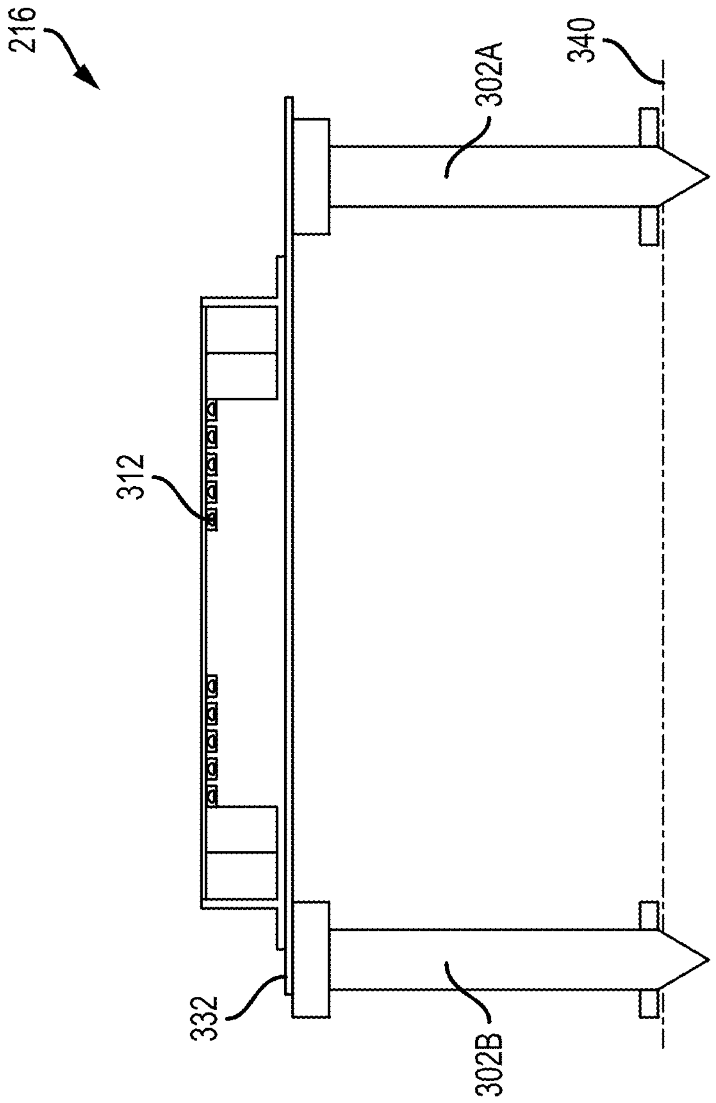
FIG. 3C shows a plan view of aspects of the apparatus of FIG. 3A in accordance with embodiments of the present disclosure.

With reference to FIGS. 3A-3C, a second embodiment of a wiring device 216 according to aspects of the present disclosure is illustrated. In some examples, the wiring device 216 may be similar to or the same as the wiring device 116. The wiring device 216 is illustrated to comprise a PCB 336, a plate or platform 304, and a connection means such as a bracket 320 and/or stakes 302A-302N.

The PCB 336 may in some examples be similar to or the same as the PCB 136. In other examples, the PCB 336 may be a linear PCB. For instance, the PCB 336 may be rectangular in shape. The PCB 336 is illustrated to comprise ground ports 308 and a power strip 312. The ground ports 308 may be similar to or the same as the ground ports 208A-208N of the wiring device 116, and the power strip 312 may comprise a plurality of ports that are similar to the zone valve ports 212A-212N of the wiring device 116. In other words, the PCB 336, the ground ports 308, and the power strip 312 may provide similar or the same functionality as the functionality discussed with respect to the PCB 136, the ground ports 208A-208N, and the zone valve ports 212A-212N. In some examples, the PCB 336, the ground ports 308, and/or the power strip 312 may be placed in a housing (not shown).

The plate 304 and the bracket 320 may be connected to the PCB 336 to enable the wiring device 216 to be connected to one or more surfaces of the valve box 112 and to position the wiring device 216 above a ground surface 340 inside of the valve box 112. The bracket 320 may in some cases be similar to or the same as the mounts 224A-224B. Additionally or alternatively, the wiring device 216 may comprise a base 332 connected to the PCB 336, the plate 304, and/or the bracket 320. The base 332 may enable the PCB 336 to be connected to one or more stakes 302A-302N (e.g., a first stake 302A, a second stake 302B, etc.). For example, the base 332 may comprise a connector 330 that interfaces with a slot 328 on a first stake 302A. The connector 330 may be inserted into the slot 328 and then rotated to secure the base 332 to the first stake 302A. Each of the stakes 302A-302N may comprise a respective slot or other attachment mechanism that enables the base 332 (and by extension the PCB 336) to be mechanically coupled with the stakes 302A-302N. Each of the stakes 302A-302N may also be adjustable. In one example, the PCB 336 may be placed between 12 and 14 inches above the ground surface 340.

Figure 4:
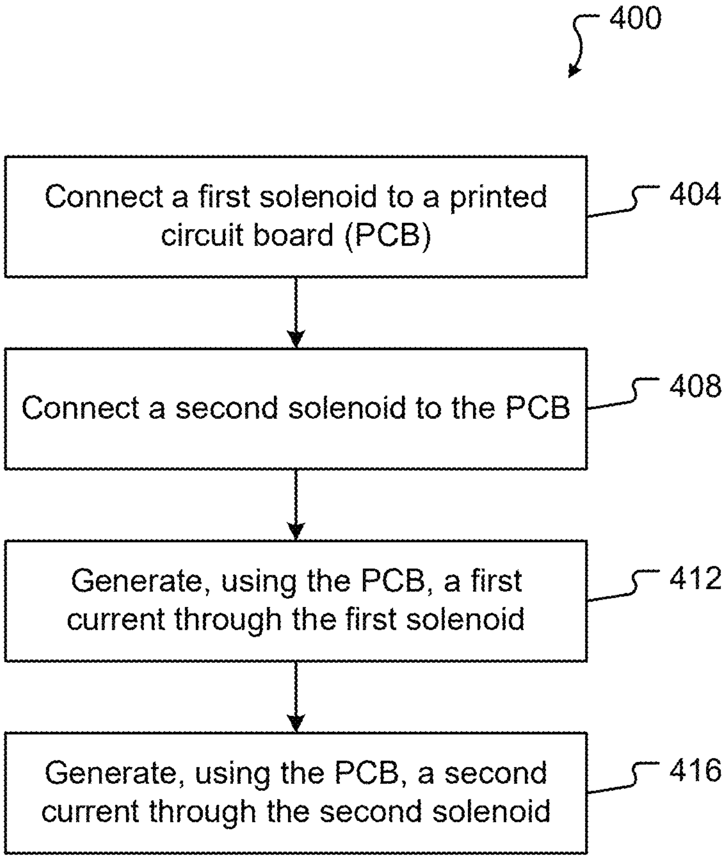
FIG. 4 shows a flowchart in accordance with embodiments of the present disclosure.

FIG. 4 depicts a method 400 according to at least one example embodiment of the present disclosure. FIG. 4 will be discussed with reference to the foregoing components, but the method 400 may be applied for additional or alternative irrigation systems.

Operation 404 includes connecting a first solenoid to a printed circuit board (PCB). The PCB may in some examples be similar to or the same as the PCB 136 and the PCB 336. The first solenoid may be positioned on a solenoid valve (e.g., the first solenoid valve 132A). A first ground wire of the first solenoid may be connected to a ground port (e.g., one of the ground ports 208A-208N or 308A-308N) of the PCB 136 or 336, and a second "hot" wire of the first solenoid may be connected, along with the sprinkler clock 160, to a zone valve port (e.g., the first zone valve port 212A or 312A) of the PCB 136 or 336.

Operation 408 includes connecting a second solenoid to the PCB. The second solenoid may be positioned on a second solenoid valve (e.g., the second solenoid valve 132B). A ground wire of the second solenoid may be connected to a ground port (e.g., one of the ground ports 208A-208N or 308A-308N) of the PCB 136 or 336, and a "hot" wire of the second solenoid may be connected, along with the sprinkler clock 160, to a zone valve port (e.g., the second zone valve port 212B or 312B) of the PCB 136 or 336.

Operation 412 includes generating, using the PCB, a first current through the first solenoid. The first current may be passed from the sprinkler clock 160 through the PCB to flow through the first solenoid. In some cases, the voltage across the first solenoid and/or the current flowing through the first solenoid may be measured and displayed on a display (e.g., display 272). In some cases, the display may be part of a user's mobile device (e.g., displayed to the user's smartphone screen via an irrigation application) and the information may be displayed to the user remotely from the PCB. In some examples, one or more illumination devices on the PCB may be illuminated based on, for example, whether the voltage across the first solenoid is equal to or greater than (or, in some cases, less than) a threshold voltage value, whether the current conducted by the first solenoid is equal to or greater than (or, in some cases, less than) a threshold current value, whether the first solenoid is active, combinations thereof, and/or the like.

Operation 416 includes generating, using the PCB, a second current through the second solenoid. The second current may be passed from the sprinkler clock 160 through the PCB to flow through the second solenoid. In some cases, the voltage across the second solenoid and/or the current flowing through the second solenoid may be measured and displayed on a display (e.g., display 272). In some cases, the display may be part of a user's mobile device (e.g., displayed to the user's smartphone screen via an irrigation application) and the information be displayed to the user remotely from the PCB. In some examples, one or more illumination devices on the PCB may be illuminated based on, for example, whether the voltage across the second solenoid is equal to or greater than (or, in some cases, less than) a threshold voltage value, whether the current conducted by the second solenoid is equal to or greater than (or, in some cases, less than) a threshold current value, whether the second solenoid is active, combinations thereof, and/or the like.

As may be appreciated, more or fewer operations of the method 400 may exist and/or more or fewer operations of the method may be performed autonomously.

Any of the steps, functions, and operations discussed herein can be performed continuously and automatically.

The exemplary systems and methods of this disclosure have been described in relation to systems, methods, devices, and apparatuses for wiring, testing, and/or controlling irrigation systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Figure 2I:
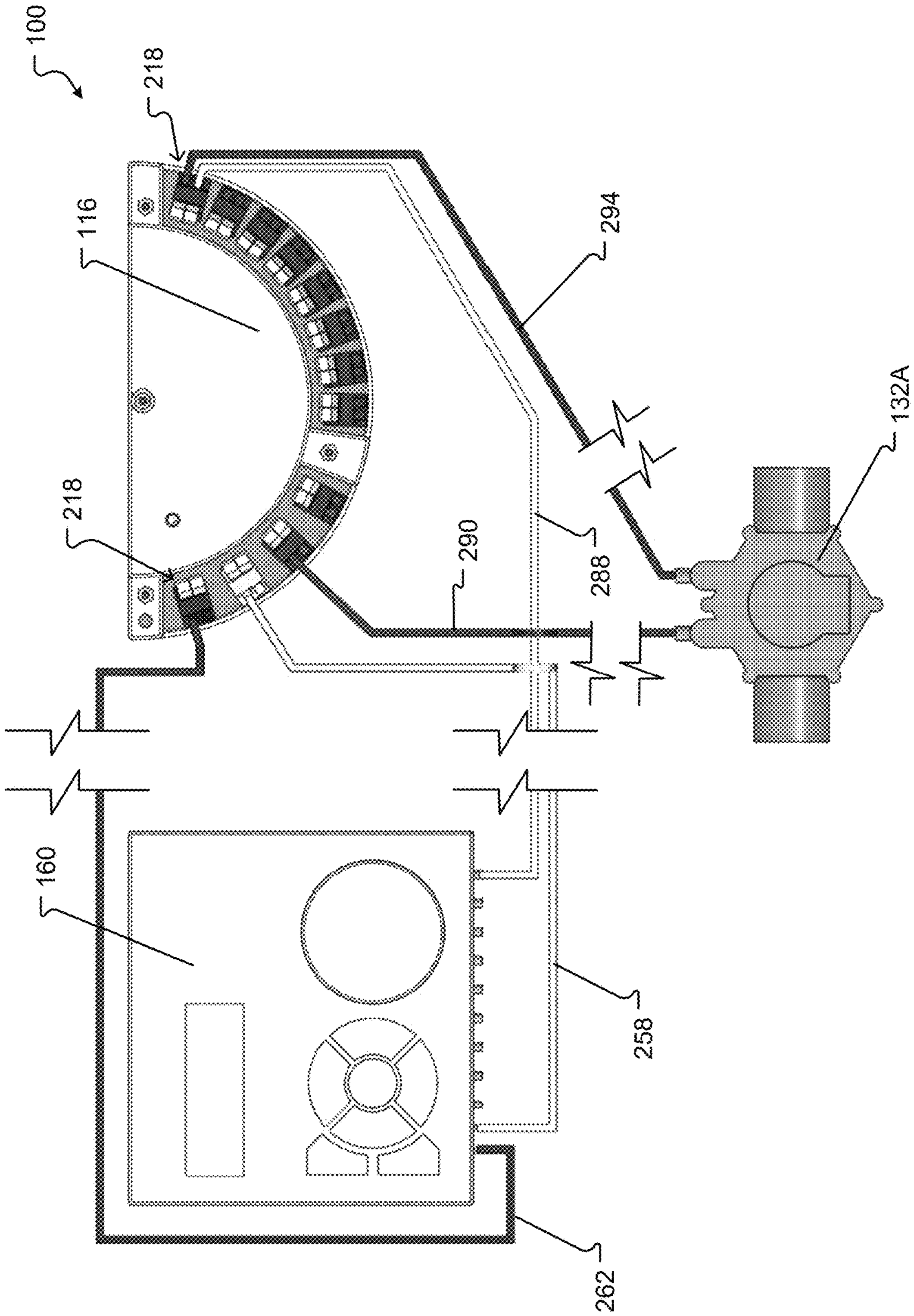
FIG. 2I shows aspects of a sprinkler clock connected to the PCB of the apparatus of FIG. 2A with wire connectors in accordance with embodiments of the present disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. As a non-limiting example, the connector of FIG. 2G could be substituted for some or all the ground port(s) and/or zone valve port(s) on the platform illustrated in FIG. 2A to connect the solenoid wires and/or the clock wires to the PCB. An example of the platform with connectors substituted for all the ground ports and zone valve ports is shown in FIG. 2I. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Example aspects of the present disclosure include:

An irrigation control apparatus according to at least one embodiment of the present disclosure is positionable within a subterranean space, the subterranean space having a bottom surface, the irrigation control apparatus comprising: a platform containing a printed circuit board (PCB); at least one zone valve port electrically connected to the PCB; at least one ground port electrically connected to the PCB; and an attachment mechanism for positioning the platform above the bottom surface of the subterranean space, wherein the at least one zone valve port and the at least one ground port are configured to electrically connect to a solenoid associated with a valve.

Any of the aspects herein, wherein the platform is semi-circular in shape.

Any of the aspects herein, wherein the attachment mechanism comprises a stake.

Any of the aspects herein, wherein the stake is rotatably connectable to the platform.

Any of the aspects herein, wherein the attachment mechanism comprises a bracket.

Any of the aspects herein, wherein the bracket is rotatably connectable to the platform.

Any of the aspects herein, wherein the bracket comprises an aperture on an upper portion thereof.

Any of the aspects herein, wherein an upper portion of the bracket is configured to mount to a surface of a valve box to position the platform at a first distance above the bottom surface of the subterranean space.

Any of the aspects herein, wherein the at least one zone valve port comprises a toolless connector configured to receive a first wire from the solenoid and a second wire from a sprinkler clock.

Any of the aspects herein, wherein the first wire is a stranded wire, and wherein the second wire is a solid wire.

Any of the aspects herein, wherein a power source is connected to the at least one zone valve port.

Any of the aspects herein, wherein the power source is connected to a sprinkler clock.

Any of the aspects herein, further comprising: a computer chip mounted on the PCB comprising: a processor; and a memory coupled with the processor and storing data thereon that, when processed by the processor, enable the processor to: determine at least one of a voltage value across the solenoid and a current value conducted by the solenoid; and cause, via a communication module, the at least one of the voltage value and the current value to be displayed.

Any of the aspects herein, wherein the at least one of the voltage value and the current value is displayed on at least one of a mobile device and a display connected to the PCB.

Any of the aspects herein, further comprising: an illumination device, wherein the illumination device emits light when the at least one of the voltage value and the current value meets or exceeds a threshold value, and does not emit light when the at least one of the voltage value and the current value does not meet the threshold value.

Any of the aspects herein, wherein the at least one zone valve port comprises a first zone valve port connectable to the solenoid and a second zone valve port connectable to a second solenoid, and wherein a second illumination device emits light when at least one of a voltage value across the second solenoid and a current value conducted by the second solenoid meets or exceeds a threshold value.

Any of the aspects herein, further comprising: a moisture sensor, wherein the processor further disables at least one of the PCB and the solenoid when a measurement from the moisture sensor meets or exceeds a threshold value.

Any of the aspects herein, wherein the at least one zone valve port is configured to electrically connect to a power source, and wherein the at least one ground port is configured to electrically connect to a ground source.

An irrigation control apparatus according to at least one embodiment of the present disclosure is positionable within a subterranean space, the subterranean space having a lower surface, the irrigation control apparatus comprising: a platform containing a printed circuit board (PCB); a first illumination device and a second illumination device each connected to the PCB; a first zone valve port and a second zone valve port each electrically connected to the PCB; a first ground port and a second ground port each electrically connected to the PCB; and an attachment mechanism for positioning the platform above the lower surface of the subterranean space, wherein the first zone valve port and the first ground port are connectable to a first solenoid, wherein the second zone valve port and the second ground port are connectable to a second solenoid, wherein the first zone valve port and the second zone valve port are connectable to a power source, wherein the first ground port and the second ground port are connectable to a ground, wherein the first illumination device illuminates when the first solenoid receives power, and wherein the second illumination device illuminates when the second solenoid receives power.

Any of the aspects herein, wherein the attachment mechanism comprises a stake rotatably connected to the platform.

Any of the aspects herein, wherein a valve box is disposed at least partially in the subterranean space, and wherein the attachment mechanism comprises a bracket configured to mount to the valve box.

Any of the aspects herein, further comprising: a display connected to the PCB.

Any of the aspects herein, wherein the PCB is toggleable to power the first solenoid and the second solenoid.

Any of the aspects herein, wherein the platform is semi-circular.

Any of the aspects herein, wherein the first solenoid and the second solenoid are connected to a shutoff valve.

Any of the aspects herein, wherein the shutoff valve remains closed until at least one of the first solenoid and the second solenoid are actuated.

Any of the aspects herein, wherein the first solenoid is actuated based on a measurement from a moisture sensor.

Any of the aspects herein, wherein the PCB records historical water usage information for at least one of a first zone associated with the first solenoid and a second zone associated with the second solenoid.

A method of testing electrical functionality of an irrigation system according to at least one embodiment of the present disclosure comprises: connecting a first solenoid, via a first zone valve port and a first ground port, to a printed circuit board (PCB) of a platform positioned above a ground surface of a subterranean space; connecting a second solenoid, via a second zone valve port and a second ground port, to the PCB; generating, using the PCB, a first current through the first solenoid; and generating, using the PCB, a second current though the second solenoid.

Any of the aspects herein, wherein a first illumination device illuminates when the first solenoid conducts the first current, wherein a second illumination device illuminates when the second solenoid conducts the second current.

Any of the aspects herein, wherein a power source is connected to the at least zone valve port.

Any of the aspects herein, wherein the power source is connected to a sprinkler clock.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. An irrigation control apparatus positionable within a subterranean space, the subterranean space having a bottom surface, the irrigation control apparatus comprising:
- a platform;
- at least one zone valve terminal electrically connected to the platform;
- at least one ground terminal electrically connected to the platform; and
- at least one bracket for positioning the platform above the bottom surface of the subterranean space, wherein the at least one bracket comprises an upper portion configured to mount to an upward-facing surface of a valve box to position the platform at a first distance above the bottom surface of the subterranean space,
- wherein the at least one zone valve terminal and the at least one ground terminal are configured to electrically connect a solenoid associated with a zone valve to the platform.

2. The irrigation control apparatus of claim 1, wherein the platform is semi-circular in shape.

3. The irrigation control apparatus of claim 1, wherein the at least one bracket is rotatably connectable to the platform.

4. The irrigation control apparatus of claim 1, wherein the at least one zone valve terminal comprises a toolless connector.

5. The irrigation control apparatus of claim 4, wherein the toolless connector comprises a first terminal configured to receive a stranded wire, and a second terminal configured to receive a solid wire.

6. The irrigation control apparatus of claim 1, wherein a power source is connected to the at least one zone valve terminal.

7. The irrigation control apparatus of claim 6, wherein the power source is connected to a sprinkler clock.

8. The irrigation control apparatus of claim 1, further comprising:
- a computer chip mounted on a printed circuit board (PCB) of the platform, the computer chip comprising:
  - a processor; and
  - a memory coupled with the processor and storing data thereon that, when processed by the processor, enable the processor to:
    - determine at least one of a voltage value across the solenoid and a current value conducted by the solenoid; and cause, via a communication module, the at least one of the voltage value and the current value to be displayed.

9. The irrigation control apparatus of claim 8, wherein the at least one of the voltage value and the current value is displayed on at least one of a mobile device and a display connected to the PCB.

10. The irrigation control apparatus of claim 8, further comprising:

an illumination device, wherein the illumination device emits light when the at least one of the voltage value and the current value meets or exceeds a threshold value, and does not emit light when the at least one of the voltage value and the current value does not meet the threshold value.

11. The irrigation control apparatus of claim 10, wherein the at least one zone valve terminal comprises a first zone valve terminal configured to connect the solenoid to the platform and a second zone valve terminal configured to connect a second solenoid to the platform, and wherein a second illumination device emits light when at least one of a voltage value across the second solenoid and a current value conducted by the second solenoid meets or exceeds a threshold value.

12. The irrigation control apparatus of claim 8, further comprising:

a moisture sensor, wherein the processor further disables at least one of the printed circuit board (PCB) within the platform and the solenoid when a measurement from the moisture sensor meets or exceeds a threshold value.

13. The irrigation control apparatus of claim 1, wherein the at least one zone valve terminal is configured to electrically connect the solenoid to a power source, and wherein the at least one ground terminal is configured to electrically connect the solenoid to a ground source.

14. The irrigation control apparatus of claim 1, wherein the at least one bracket further comprises a lower portion with an aperture configured to engage with a connector disposed on a bottom surface of the platform.

15. The irrigation control apparatus of claim 1, wherein the upper portion of the at least one bracket extends away from the platform in a first direction to mount to the upward-facing surface of the valve box.

16. The irrigation control apparatus of claim 1, wherein the upper portion further comprises an aperture configured to receive a fastener to mount to the upward-facing surface of the valve box.

17. The irrigation control apparatus of claim 1, wherein the at least one bracket is reusable to enable the irrigation control apparatus to be selectively removed and reinstalled in the subterranean space.

18. An irrigation control apparatus positionable within a subterranean space, the subterranean space having a bottom surface, the irrigation control apparatus comprising:

a platform containing a processor;

a first illumination device and a second illumination device each coupled with the processor;

a first zone valve terminal and a second zone valve terminal each electrically coupled with the processor;

a first ground terminal and a second ground terminal each electrically coupled with the processor; and a bracket for positioning the platform above the bottom surface of the subterranean space, wherein the bracket comprises an upper portion configured to releasably engage with a lip of a valve box to position the platform a first distance above the bottom surface of the subterranean space, wherein the first zone valve terminal and the first ground terminal are configured to connect a first solenoid to the platform, wherein the second zone valve terminal and the second ground terminal are configured to connect a second solenoid to the platform, wherein the first zone valve terminal and the second zone valve terminal are configured to respectively connect the first solenoid and the second solenoid to a power source, wherein the first ground terminal and the second ground terminal are configured to respectively connect the first solenoid and the second solenoid to a ground, wherein the first illumination device illuminates when the first solenoid receives power, and wherein the second illumination device illuminates when the second solenoid receives power.

19. The irrigation control apparatus of claim 18, wherein the upper portion comprises an aperture.

20. The irrigation control apparatus of claim 18, further comprising:

a display connected to the processor.

21. The irrigation control apparatus of claim 18, wherein the processor is actionable to power the first solenoid and the second solenoid.

22. The irrigation control apparatus of claim 18, wherein the platform is semi-circular.

23. The irrigation control apparatus of claim 18, wherein the first solenoid is actuated based on a measurement from a moisture sensor.

24. The irrigation control apparatus of claim 18, wherein the platform further comprises a memory coupled with the processor and storing data thereon that, when processed by the processor, enable the processor to:

receive historical water usage information for at least one of a first zone associated with the first solenoid and a second zone associated with the second solenoid.

25. The irrigation control apparatus of claim 18, wherein the bracket further comprises a lower portion configured to engage with a connector disposed on a bottom surface of the platform.

26. The irrigation control apparatus of claim 18, wherein the upper portion of the bracket extends away from the platform in a first direction to releasably engage with the lip of the valve box.

27. The irrigation control apparatus of claim 18, wherein the bracket is reusable to enable the irrigation control apparatus to be selectively removed and reinstalled in the subterranean space.

28. An irrigation control apparatus positionable within a subterranean space, the subterranean space having a bottom surface, the irrigation control apparatus comprising:

a platform;

at least one zone valve terminal electrically connected to the platform;

at least one ground terminal electrically connected to the platform; and a stake for positioning the platform above the bottom surface of the subterranean space, wherein the at least one zone valve terminal and the at least one ground terminal are configured to electrically connect a solenoid associated with a zone valve to the platform.

29. The irrigation control apparatus of claim 28, wherein the at least one zone valve terminal comprises a toolless connector.

30. The irrigation control apparatus of claim 28, wherein the platform is rotatably connectable to the stake.

* * * * *